July 24, 1962

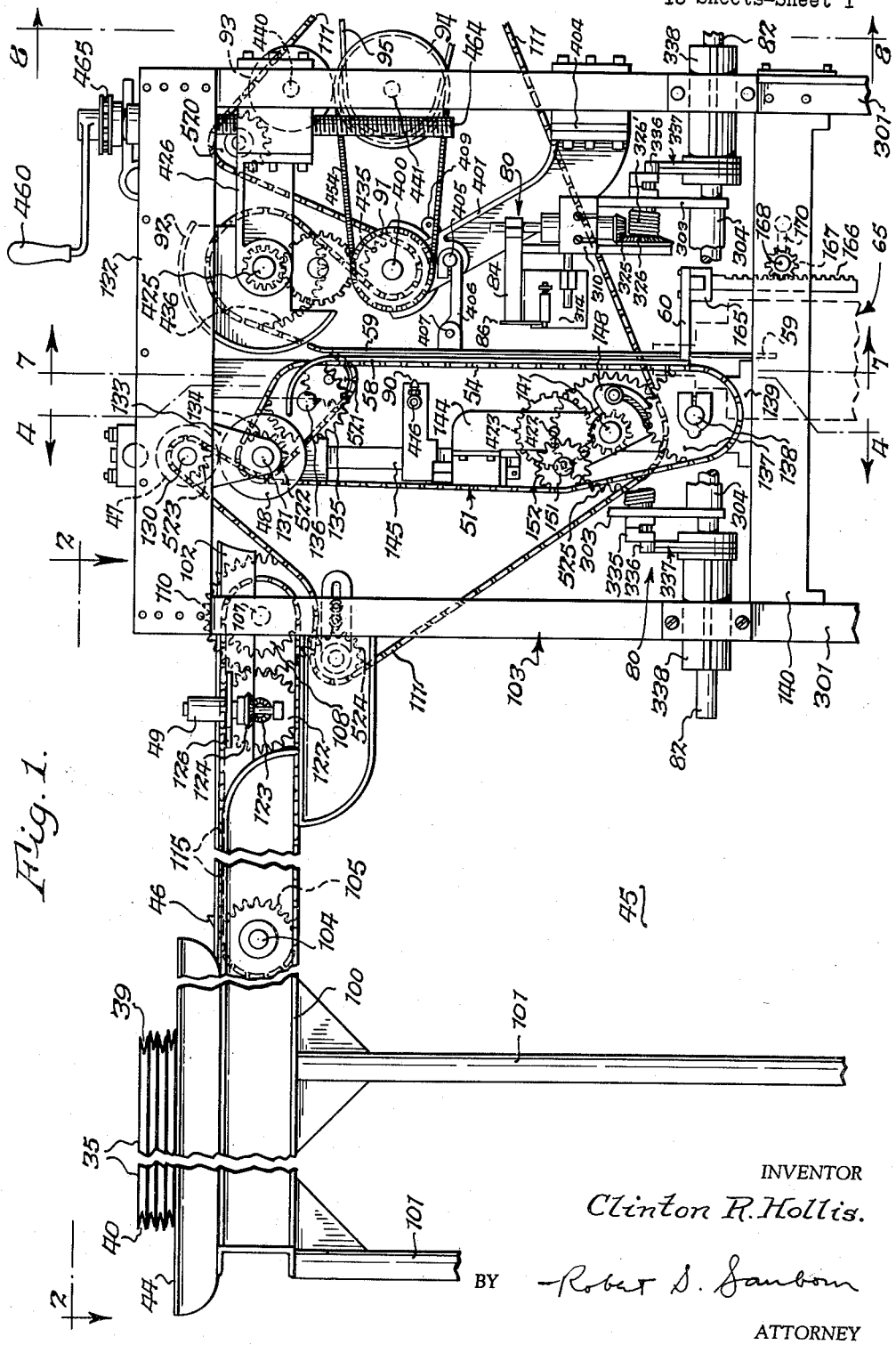

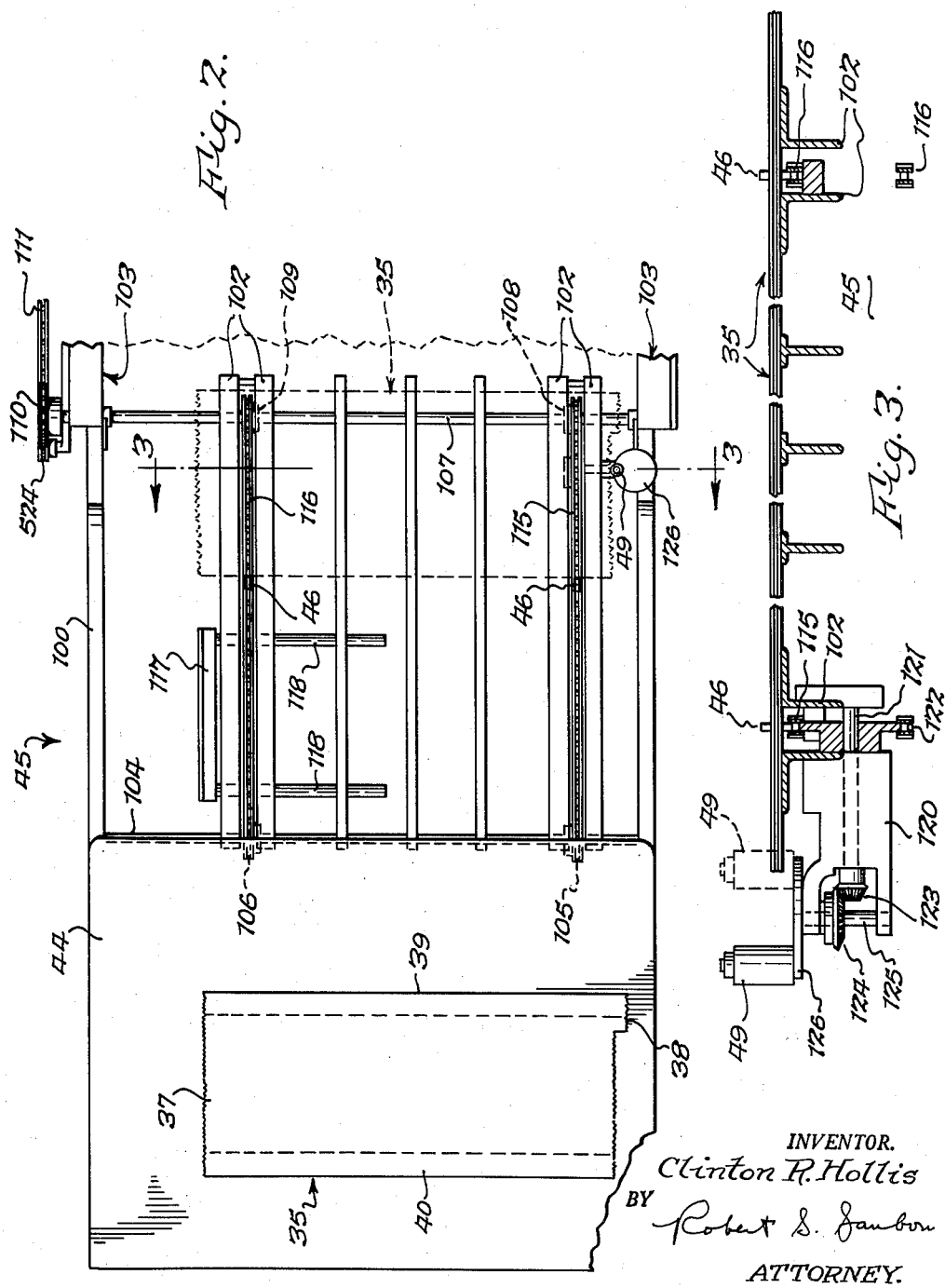

C. R. HOLLIS 3,045,559

INNER VALVE SLEEVE MACHINE

Filed Jan. 19, 1960

INVENTOR.
Clinton R. Hollis.
BY Robert S. Sanborn
ATTORNEY.

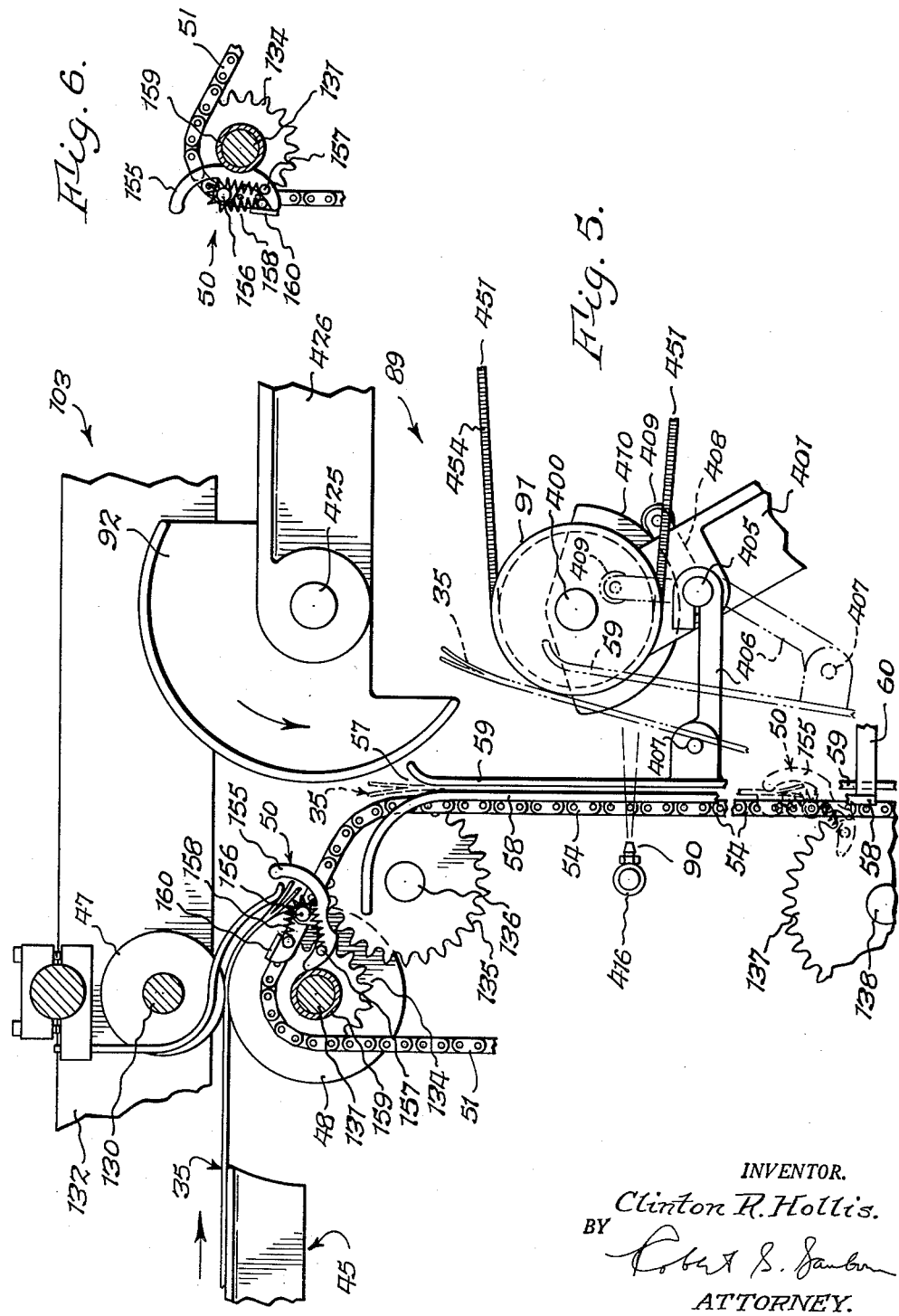

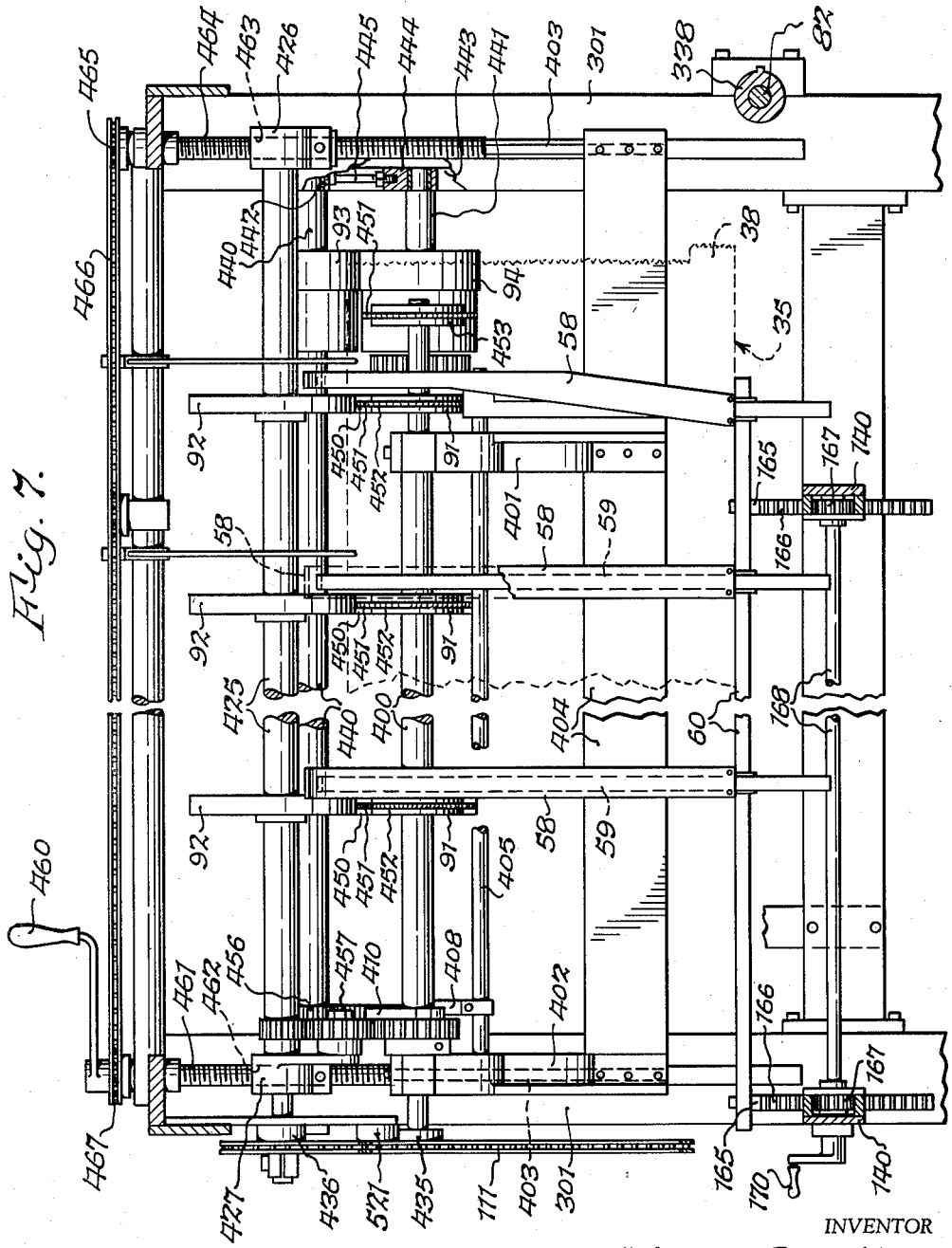

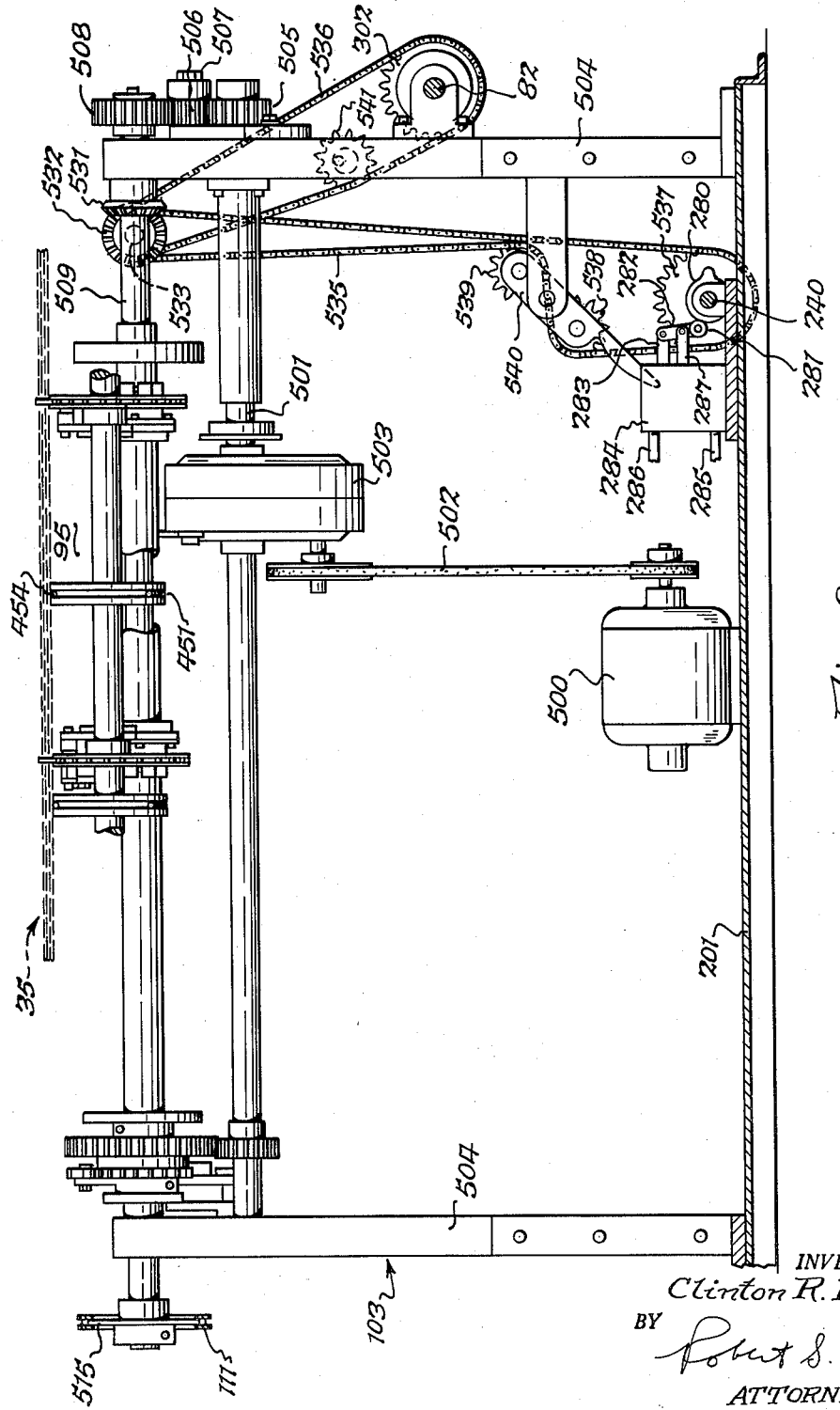

July 24, 1962 C. R. HOLLIS 3,045,559
INNER VALVE SLEEVE MACHINE
Filed Jan. 19, 1960 13 Sheets-Sheet 7
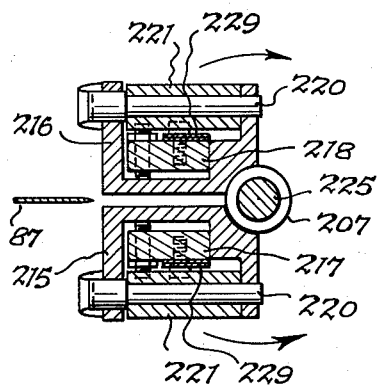
Fig. 10.
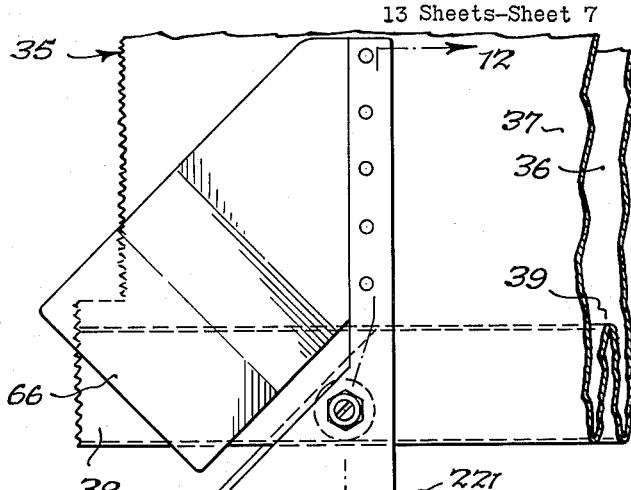
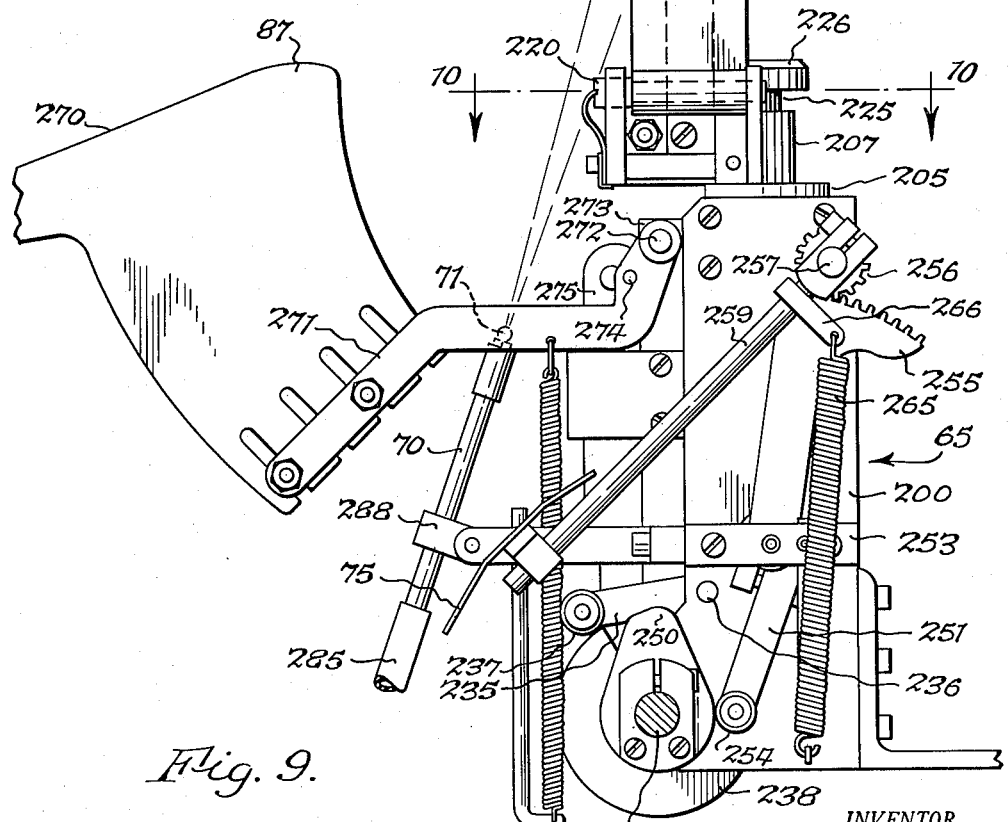
Fig. 9.
INVENTOR.
Clinton R. Hollis
BY
Robert S. Sanborn
ATTORNEY.

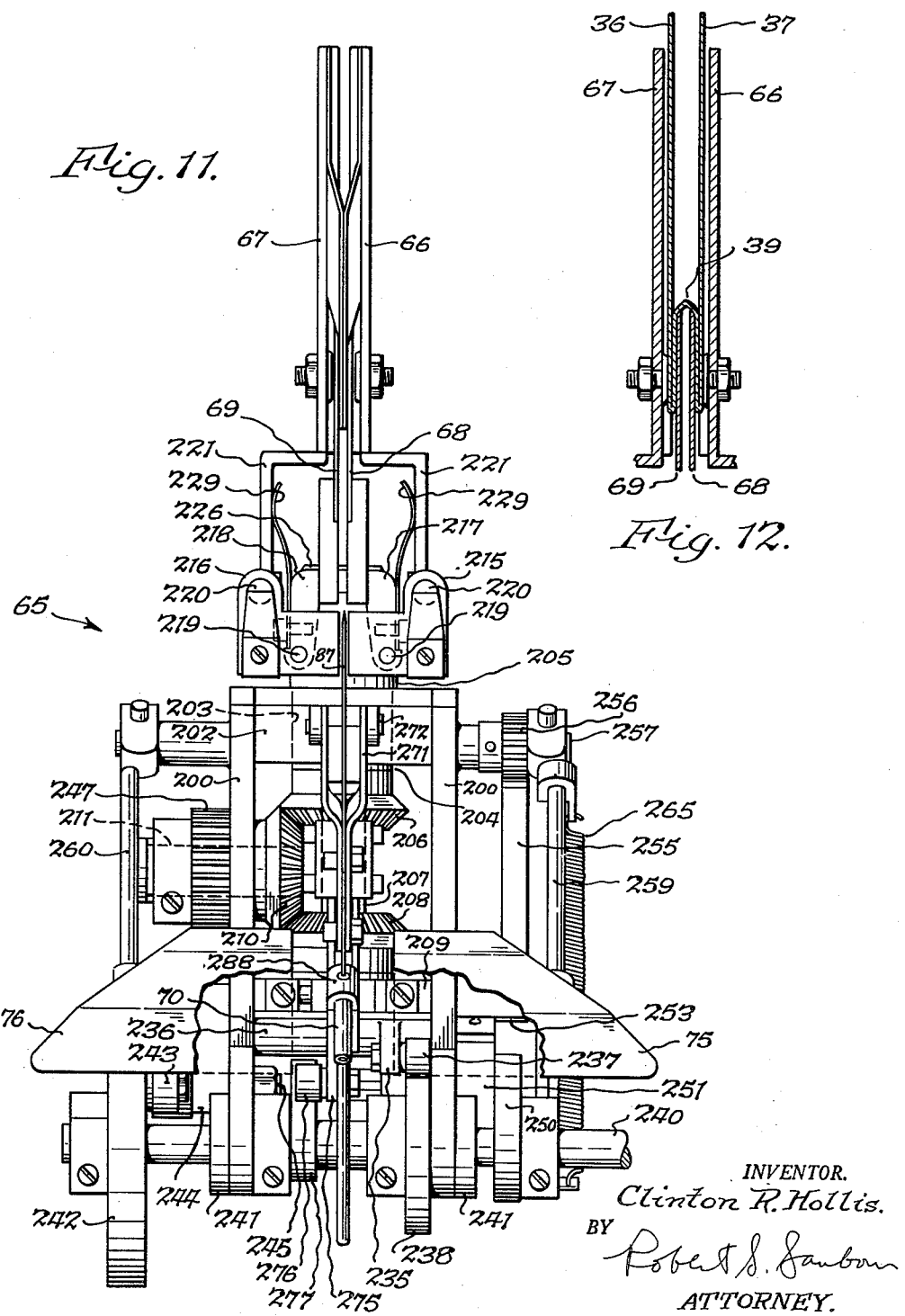

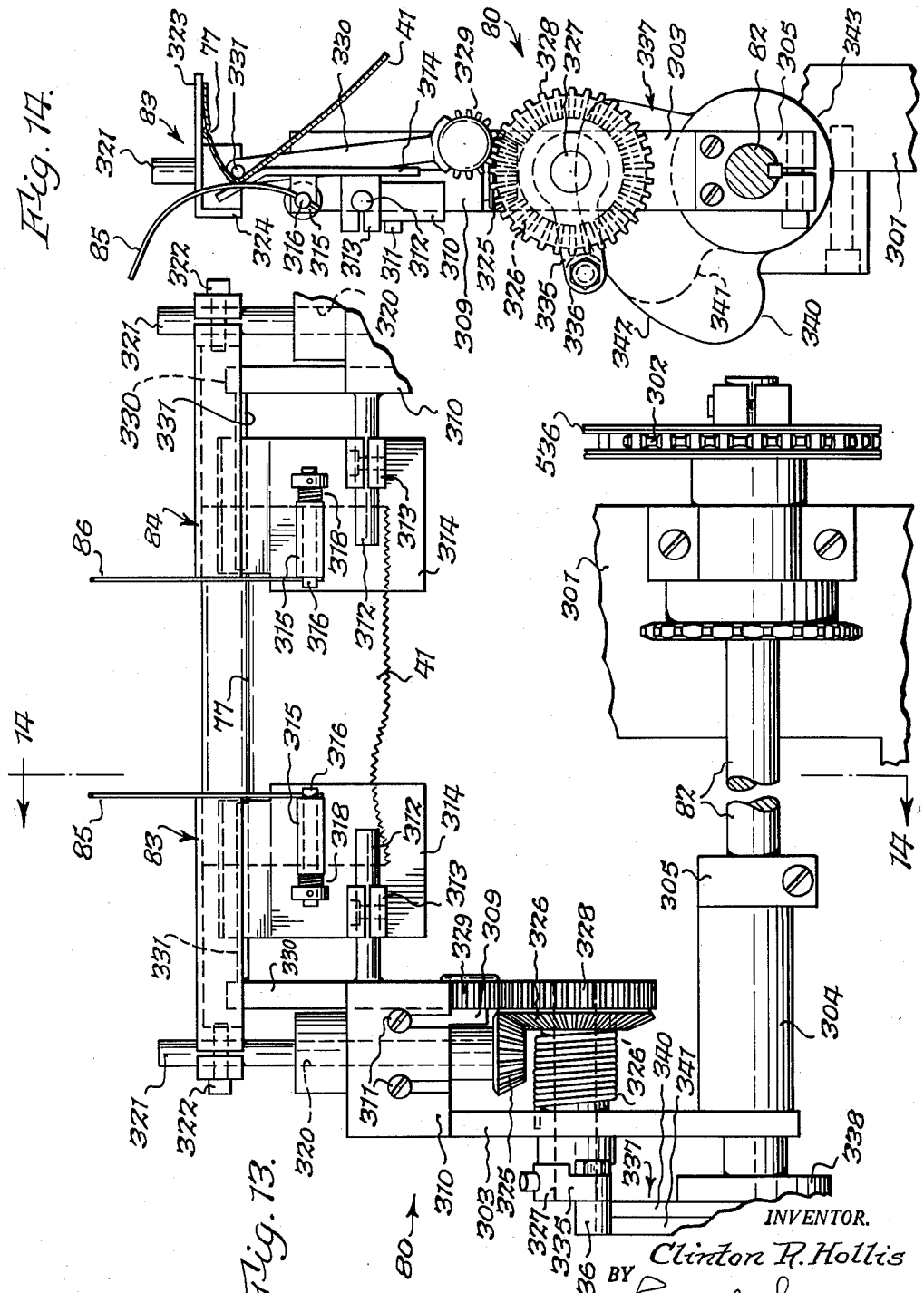

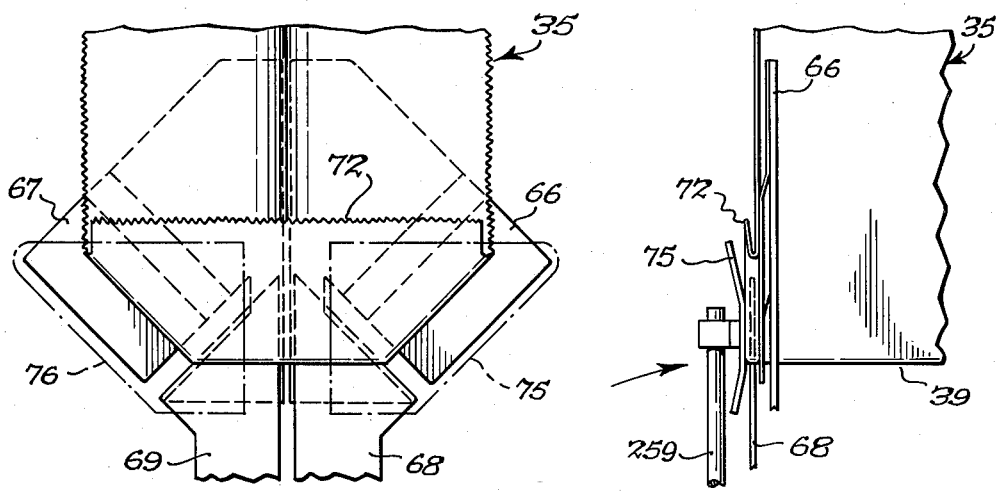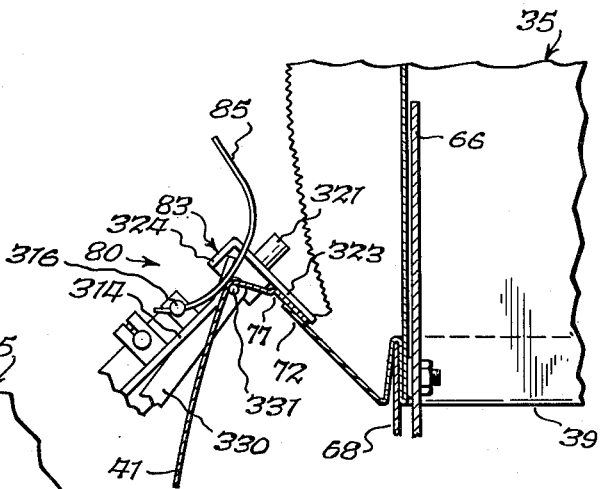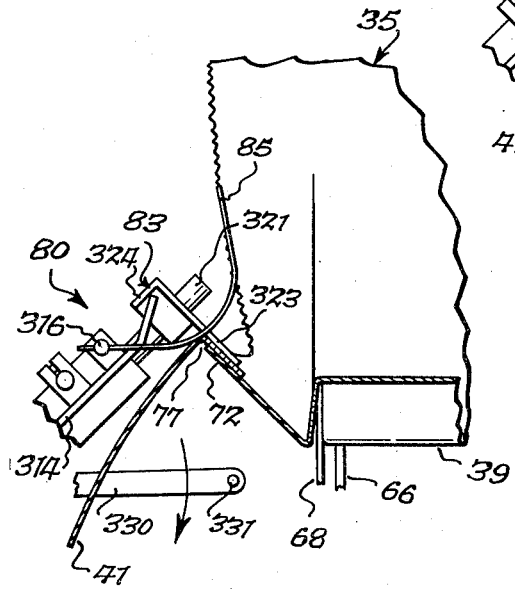

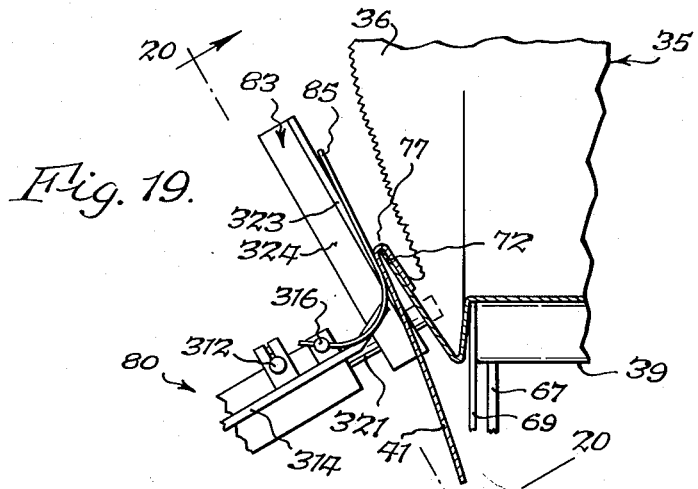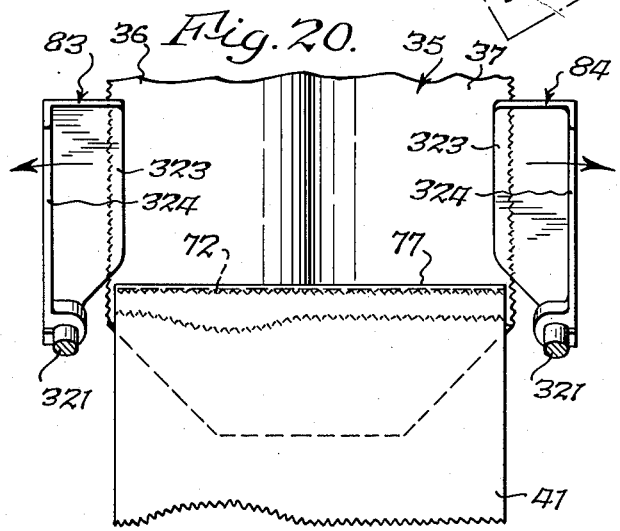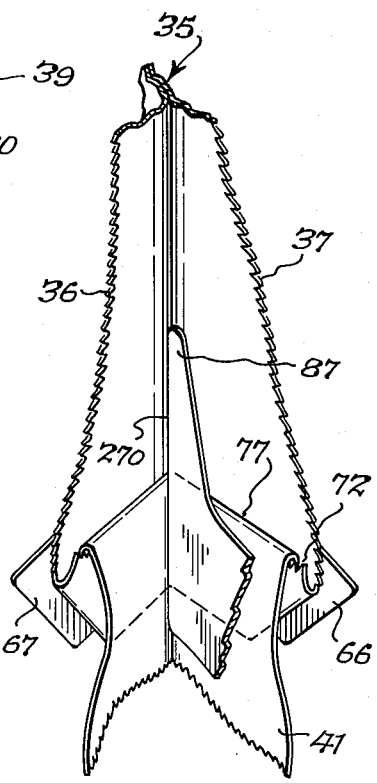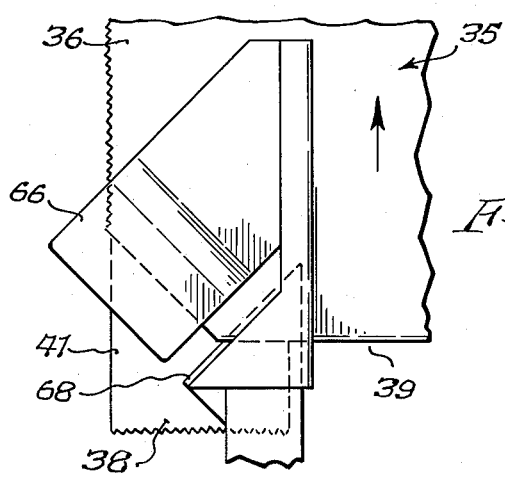

July 24, 1962
C. R. HOLLIS
3,045,559
INNER VALVE SLEEVE MACHINE
Filed Jan. 19, 1960
13 Sheets-Sheet 12
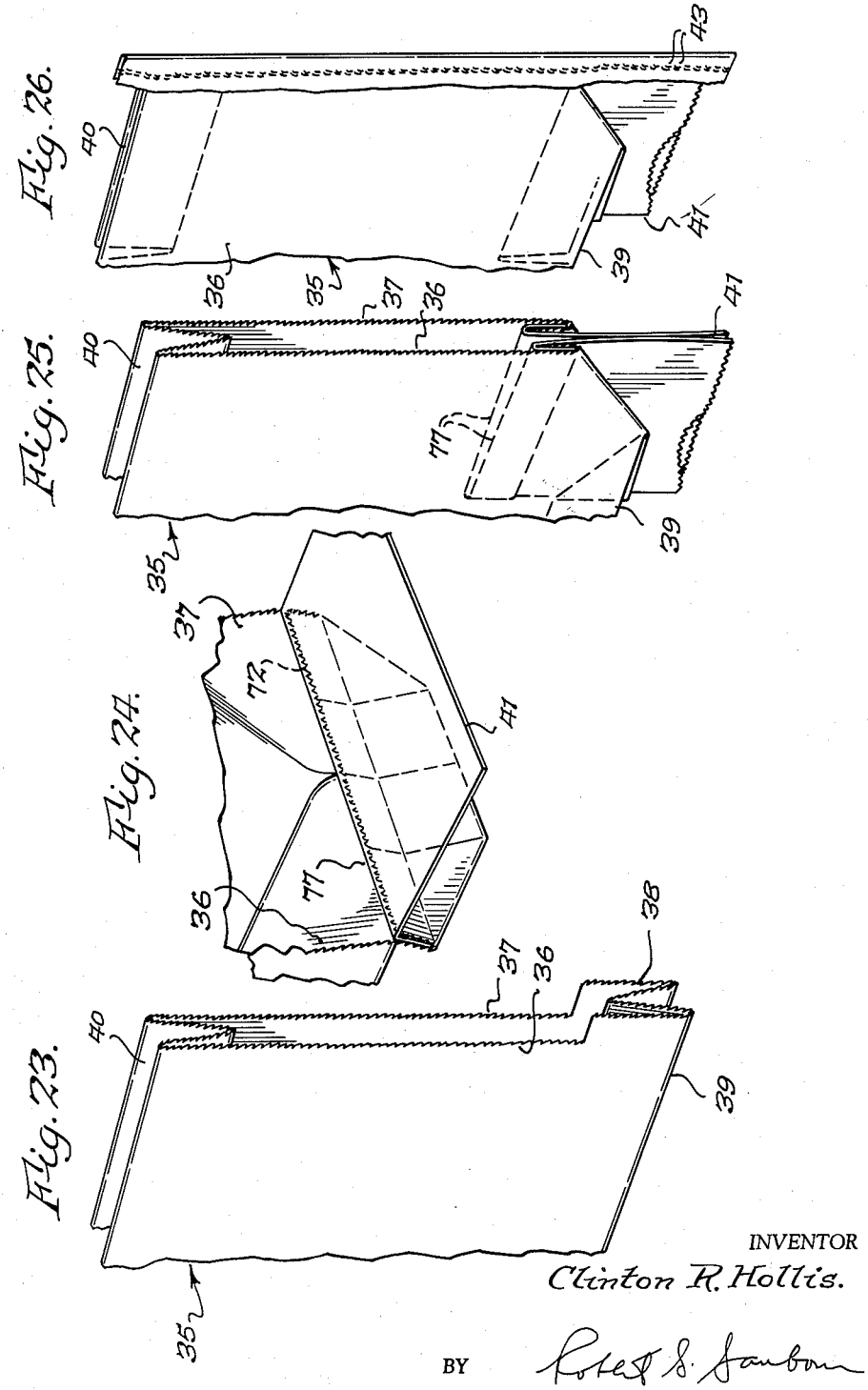
INVENTOR
Clinton R. Hollis.
BY
ATTORNEY July 24, 1962
C. R. HOLLIS
3,045,559
INNER VALVE SLEEVE MACHINE
Filed Jan. 19, 1960
13 Sheets-Sheet 13
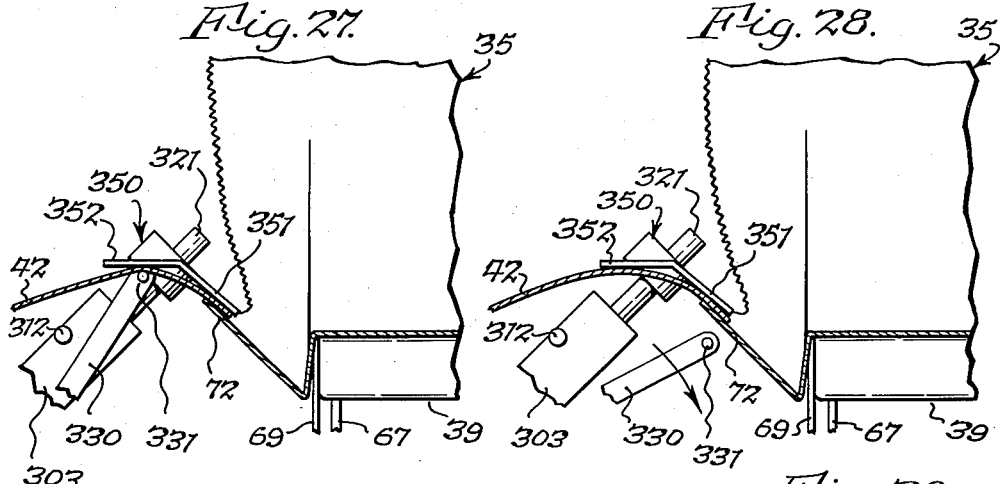
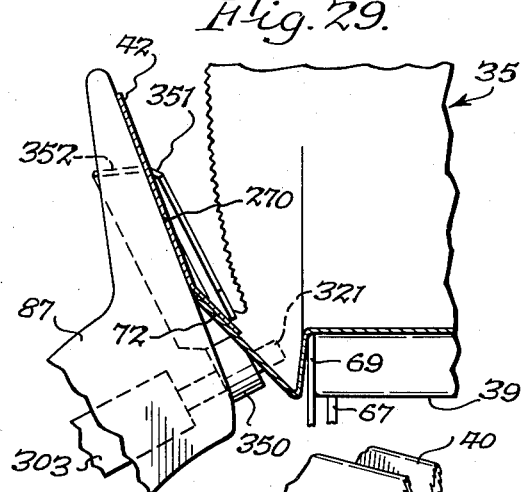
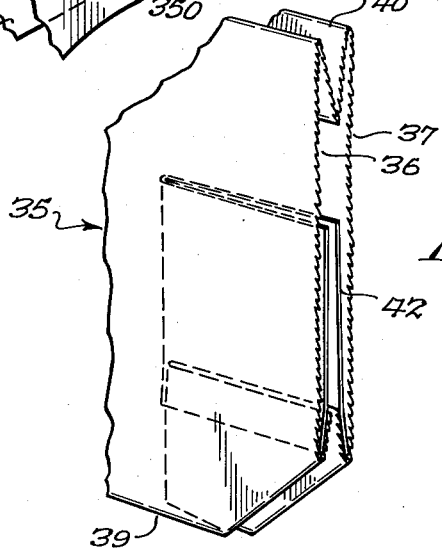
INVENTOR.
Clinton R. Hollis.
BY
ATTORNEY.

United States Patent Office 3,045,559
Patented July 24, 1962

3,045,559
INNER VALVE SLEEVE MACHINE
Clinton R. Hollis, Camden, Ark., assignor to International Paper Company, New York, N.Y., a corporation of New York
Filed Jan. 19, 1960, Ser. No. 3,377
32 Claims. (Cl. 93—8)

This invention relates to bag making machines and more particularly to such machines which are adapted to perform feeding, valving and sleeving operations on gusseted bag blanks.

There has been developed an automatic valving and sleeving machine for forming a valve in a gusseted bag tube and applying an external, or "tuck-in," type filling sleeve thereto which is extremely rapid in action and highly efficient. Such a machine is disclosed, for example, in C. R. Hollis Patent 2,809,569, issued October 15, 1957. In machines of this type, the bag tube is delivered to a predetermined location, and an opened valve is formed by folding the bag walls apart adjacent one corner of the bag in a manner such that the valve lip is disposed along a substantially straight line at right angles to the bag's longitudinal axis. A sleeve insert blank is conveyed to a position adjacent the opened valve, and means is provided for tucking a portion of the insert behind the valve lip, where it is adhesively affixed. The insert is then medially creased, and the formed and sleeved valve is closed in a manner such that the sleeve extends part way out of the bag tube and is in open communication with the tube interior. The valved and sleeved bag tube is then removed from the predetermined location and is delivered to a sewing mechanism where the ends of the tube are sewn shut to form the completed bag. One particularly advantageous apparatus for delivering the bag tube to the sewing mechanism is disclosed, for example, in C. R. Hollis Patent 2,883,034, issued April 21, 1959.

Heretofore, bag valving and sleeving machines of the foregoing type have not been readily adaptable for applying various other types of sleeves, such as the so-called "inner" sleeve, for example, to the bag valve. In addition, it frequently is desirable to perform valving and sleeving operations on bags of widely varying dimensions with minimum adjustment of the machine, and many such previous machines have proved deficient in this respect. Furthermore, and this has been of special moment during the delivery of the bags to the valving and sleeving location and while the sleeved valve is formed, difficulties heretofore were encountered in rigidly and uniformly holding each successive bag in its proper position, and these difficulties frequently impaired some of the many advantages resulting from the use of machines of this type.

One general object of this invention, therefore, is to provide a new and improved bag making machine which is particularly adaptable for automatically and accurately performing feeding, valving and sleeving operations on gusseted bag blanks.

More specifically, it is an object of this invention to provide such a machine which is adapted to form a bag valve in a rapid and straightforward manner and to apply various alternative types of sleeves thereto.

Another object of this invention is to provide a machine of the character indicated in which the bags are firmly and positively held in position during operation of the machine.

A further object of this invention is to provide a bag making machine which is adapted to accommodate bags of widely varying dimensions.

Still another object of this invention is to provide a bag making machine utilizing comparatively simple mechanical elements, which machine is economical to manufacture and throughly reliable in operation.

In one illustrative embodiment of this invention, there is provided a machine for automatically performing valving and sleeving operations on gusseted bags which includes a delivery mechanism for feeding the bags in succession from a supply thereof to a predetermined location, where each bag is supported in a substantially upright position. As the bag approaches this location, a portion of the gusset adjacent one corner of the bag is opened, and valve forming means is provided for receiving the opened gusset. The valve forming means firmly grips the bag corner and forms an opened valve by folding the walls of the bag apart to effect infolding of the bag material adjacent this corner. In this position, the infolded material forming the opened valve lies in a uniform plane with the edge of the valve lip extending in a direction perpendicular to the side walls of the bag. A presser mechanism momentarily engages the outer face of the opened valve to maintain it in its flattened condition, and tucking means is provided for inserting a portion of a sleeve insert blank behind the valve lip and into contact therewith. The sleeve insert blank and the valve are then medially creased, and the valve forming means closes the formed and sleeved valve. Upon the completion of the valving and sleeving operation, discharge means is provided for automatically removing each successive bag from the predetermined location.

In accordance with one feature of the invention, primarily as a result of the particular construction and arrangement of the tucking means and associated parts, the machine quickly and easily may be adjusted to form various alternative types of valve sleeves from the insert blank. As an illustration, in one particularly advantageous embodiment, the tucking means is adapted to first insert one portion of the sleeve blank behind the valve lip and then fold the remaining portion into contact with the outer face of the valve, thereby forming an external type sleeve when the valve is closed. Alternatively, in accordance with this embodiment, the machine is adjusted in a manner such that the remaining sleeve portion is maintained in a position away from the outer face of the valve upon the insertion of the first portion therebehind, so that, when the sleeve blank and valve are creased and closed, the resulting sleeve is of the internal type.

In accordance with another feature of the invention, there is provided pneumatic means which is automatically operable during the delivery of the bag to the predetermined location for opening the gusset portion to thereby facilitate the gripping thereof by the valve forming means. In this manner, a positive and uniform clamping of the gusset during the valving and sleeving operation is insured, and the possibilities of malfunction are greatly reduced.

In accordance with still another feature of the invention, the means for supporting each successive bag at the predetermined location includes guide means which is movable between a first position and a second position. In its first position, the guide means is adapted to maintain the side walls of the bag in a substantially upright position, while in its second position the guide means is disposed adjacent a feed roll which is operatively associated wtih a rotary outfeed sector. Upon the completion of the valving and sleeving operation, the guide means automatically moves from the first position to the second position, thereby positioning the upper gusseted edge of each valved and sleeved bag in juxtaposition with the feed roll. As the sector rotates, the valved and sleeved bags are successively withdrawn from the guide means in a uniform and straightforward manner.

In accordance with a further feature of the invention, in certain embodiments, the delivery mechanism is adapted to accurately prealign the bags while feeding them in succession to the valve forming means, thereby insuring uniformity between successive sleeved valves.

The present invention as well as further objects and features thereof will be understood more clearly and fully from the following description of a preferred embodiment thereof, when read in conjunction with the accompanying drawings in which:

FIGURE 1 is a side elevational view of a preferred feeding, valving and sleeving machine constructed in accordance with the invention, with certain parts omitted for purposes of clarity;

FIGURE 2 is a top plan view of a portion of the machine, as viewed along the line 2—2 in FIGURE 1;

FIGURE 3 is an enlarged sectional view, partially broken away, taken along the line 3—3 in FIGURE 2;

FIGURE 5 is an enlarged sectional view of a portion of the machine, taken along the line 5—5 in FIGURE 4;

FIGURE 6 is a fragmentary sectional view of certain of the parts shown in FIGURE 5 but with the parts in a different position;

FIGURE 7 is a vertical sectional view taken generally along the line 7—7 in FIGURE 1, with certain parts broken away for purposes of clarity;

FIGURE 8 is a vertical sectional view of portions of a drive mechanism and associated parts useful in connection with the invention, as viewed along the line 8—8 in FIGURE 1;

FIGURE 9 is an enlarged front elevational view of a valving and creasing mechanism constructed in accordance with the invention, as seen from the same viewpoint as that of FIGURE 4, together with a portion of a representative bag tube in position thereon;

FIGURE 10 is a sectional view taken along the line 10—10 in FIGURE 9;

FIGURE 11 is a side elevational view of the mechanism shown in FIGURE 9;

FIGURE 12 is a sectional view taken generally along the line 12—12 in FIGURE 9;

FIGURE 13 is a side elevational view of portions of a sleeve applying mechanism constructed in accordance with the invention, together with a representative sleeve blank as it is received thereby;

FIGURE 14 is a vertical sectional view taken along the line 14—14 of FIGURE 13;

FIGURE 15 is a front elevational view of the valve corner of a bag tube as it is opened by the mechanism of FIGURE 9 to flatten the valve;

FIGURE 16 is a side elevational vew of the bag valve corner in its flattened condition, together with portions of the mechanism of FIGURE 9;

FIGURES 17, 18 and 19 are vertical sectional views of the bag corner shown in FIGURE 16, together with portions of the mechanisms of FIGURES 9 and 13, illustrating the bag corner as the sleeve blank is applied thereto;

FIGURE 20 is a front elevational view similar to FIGURE 15 but illustrating the sleeve blank in position on the opened valve, together with certain parts of the mechanism of FIGURE 13;

FIGURE 21 is a fragmentary perspective view of the valve corner of the bag as the valve and sleeve are medially creased.

FIGURE 22 is an elevational view similar to a portion of FIGURE 9 but illustrating the closed bag valve with the sleeve inserted therein;

FIGURE 23 is a perspective view of the valve end of a gusseted bag tube prior to valving and sleeving;

FIGURE 24 is a fragmentary perspective view of the flattened valve corner of the tube with the sleeve blank inserted therein;

FIGURE 25 is a perspective view of the valve end of a bag tube after the valve has been formed and sleeved;

FIGURE 26 is a view similar to FIGURE 25 but showing the completed bag end after the valved and sleeved tube has been closed;

FIGURES 27, 28, 29 and 30 are vertical sectional views as seen from the same viewpoint as that of FIGURES 17–19 but illustrating another type of sleeve blank as it is applied to the bag valve; and FIGURE 31 is a perspective view of the valve end of a gusseted bag tube provided with the sleeve of FIGURES 27–30.

Figure 4:
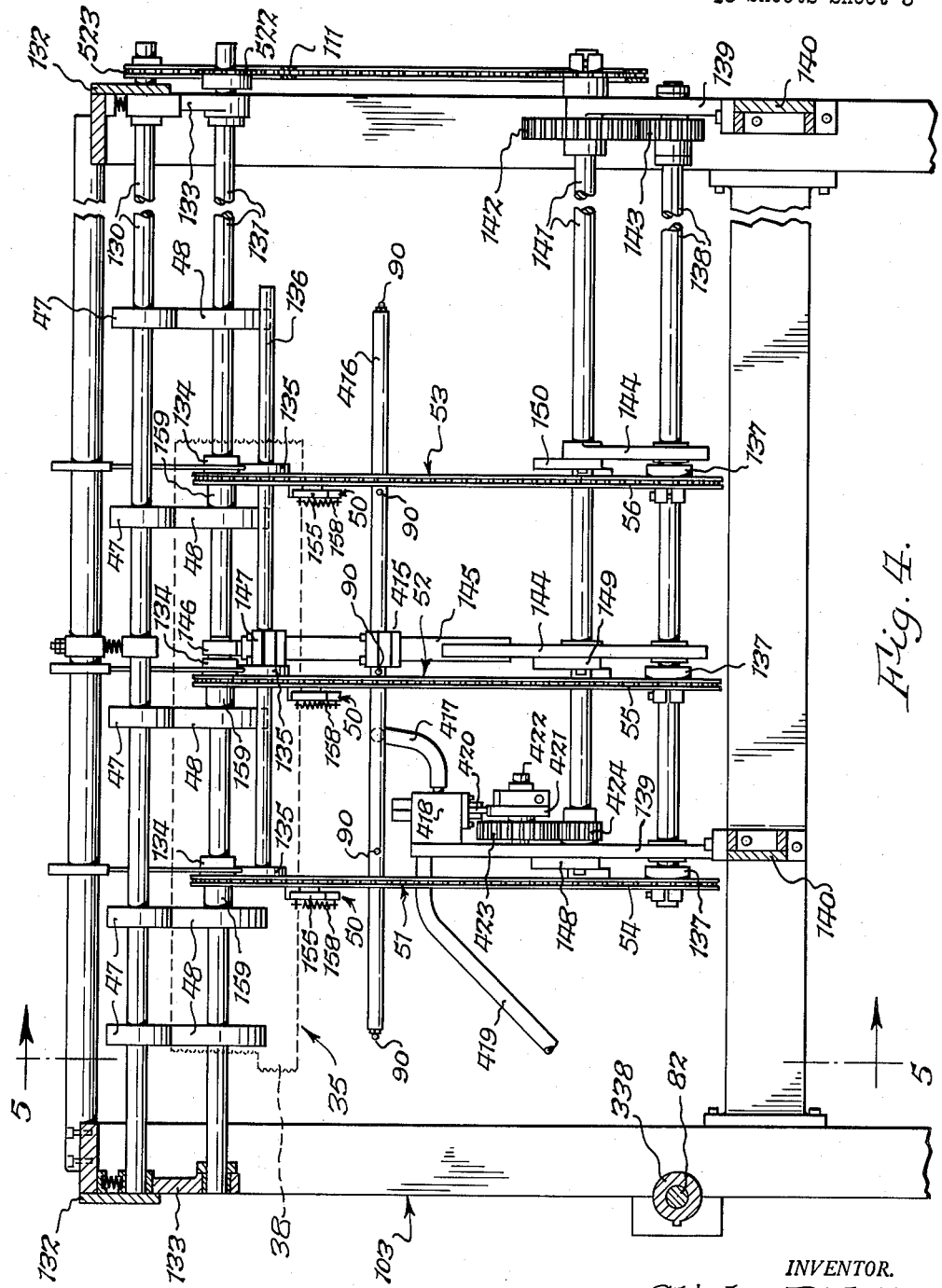
FIGURE 4 is a vertical sectional view taken generally along the line 4—4 in FIGURE 1.

Referring to the drawings, there is shown a feeding, valving and sleeving machine which is adapted to form a valved and sleeved paper bag from a substantially flat bag tube 35 (FIGURE 23). The tube 35 includes two oppositely disposed side walls 36 and 37 which each project slightly from one corner of the tube in a longitudinal direction to form a valve extension 38. In addition, the longitudinal edges of the tube are provided with folded-in gussets 39 and 40. Although for simplicity the bag tubes 35 are shown in the drawings as being of a single thickness, in practice in most cases they will be of multi-ply construction. However, it will be understood that both single-ply and multi-ply bag tubes may be processed in accordance with the invention with substantially equal facility.

The machine is adapted to form an opened valve at the corner of the bag tube 35 adjacent the extension 38 and to apply a sleeve insert blank thereto in a manner such that, when the valve is closed, there is formed an external type sleeve 41, for example, as best shown in FIGURE 25, or an internal type sleeve 42, as best shown in FIGURE 31. As will be understood, the ends of the bag tube are then closed, such as by stitching 43 (FIGURE 26), to form the completed valved and sleeved bag.

General Operation

In order to facilitate the detailed description of the feeding, valving and sleeving machine illustrated in the drawings, there will first be given a discussion of the general mode of operation of the machine. That is, before describing the construction and arrangement of the various parts of such machine, a description will be given of its overall function in the feeding, valving and sleeving of the bag tubes 35.

The bag tubes 35 to be valved and sleeved are horizontally stacked on a table 44 (FIGURES 1 and 2) and are either manually or automatically deposited one by one on an infeed mechanism indicated generally at 45. The mechanism 45 includes two chain driven lugs 46 which engage the rearwardly directed gusseted edge of each tube and advance the tubes in succession toward a pair of feed rollers 47 and 48. As each successive bag tube advances, the open end thereof adjacent the extension 38 is uniformly aligned along a horizontally extending line by means including a pusher roller 49.

As the thus aligned bag tube 35 passes through the nip formed between the feed rollers 47 and 48, the tube is firmly grasped along its leading edge by a pair of gripper mechanisms 50 (FIGURES 4, 5 and 6) which are mounted on three chains 51, 52 and 53 having vertically disposed reaches 54, 55 and 56. The bag tube is led by the gripper mechnaisms 50 to a vertical guideway 57 formed by upstanding guide members 58 and 59. The downward motion of the tube 35 in the guideway is arrested by an adjustable stop 60 which is positioned adjacent the lower ends of members 58 and 59 and is adapted to abut the leading edge of the tube. As the bag tube comes to rest, it is released by the gripper mechanisms 50, and the stop 60, together with the guide members 58 and 59, maintain the tube in its proper position for the valving and sleeving operation.

As the bag tube 35 reaches the stop 60, the valve corner thereof is received by a valving and creasing mechanism indicated generally at 65. Although for purposes of clarity the mechanism 65 has not been shown in FIGURE 1, its location is indicated by dotted lines, and it has been illustrated in detail in FIGURES 9–12. The mechanism 65 includes two upstanding wings 66 and 67 and two upstanding clamp plates 68 and 69 which are adapted to receive the lowermost gusset 39 of the tube 35 adjacent the valve corner. The wings 66 and 67 extend on the outside of the bag tube adjacent the side walls 37 and 36, respectively, while the clamp plates 68 and 69 are disposed within the gusset.

In order to facilitate the proper positioning of the side walls 36 and 37 and the gusset 39 of the bag tube between the wings and clamp plates of the mechanism 65 in the manner described above, there is provided a pneumatic tube 70 (FIGURE 9) having a nozzle portion 71 which is adapted to direct a jet of air against the portion of the gusset 39 adjacent the valve corner of the bag tube as it approaches the stop 60, thereby opening this gusset portion. Thus, as the valve corner of the bag tube drops onto the mechanism 65, the clamp plates 68 and 69 are accurately positioned within the gusset, and the wings 66 and 67 extend on the outside of the gusset adjacent the respective tube side walls 37 and 36.

After the bag tube 35 comes to rest against the stop 60, the valving and creasing mechanism 65 firmly clamps the valve corner between the wings 66 and 67 and the clamp plates 68 and 69. The wing 66 and the clamp plate 68 are then rotated ninety degrees in one direction, while the wing 67 and the clamp plate 69 are rotated ninety degrees in the opposite direction. The portions of the bag gusset 39 and the side walls 36 and 37 held by the wings and clamp plates are thereby disposed one hundred eighty degrees apart, and the valve corner of the bag tube has become opened to the position shown in FIGURE 15. In this position, the lip 72 of the opened valve is disposed along a substantially straight line which extends in a direction perpendicular to the tube side walls. The outer face of the opened valve is then engaged by two blades 75 and 76, thereby creasing the opened valve to maintain it in its flattened condition. The position of the blades 75 and 76 as they engage the outer valve face is shown by broken lines in FIGURE 15 and by full lines in FIGURE 16.

During the time that the valving and creasing mechanism 65 is effective to form and crease the opened valve, a sleeve feeding mechanism has been operative to feed a supply of paper from a suitable supply roll, to cut individual sleeve insert blanks therefrom and to apply an adhesive along one transverse portion of each blank. Although the sleeve feeding mechanism has not been shown in the drawings, one suitable mechanism for this purpose is disclosed in Hollis Patent 2,809,569 referred to heretofore. In cases where it is desired to form and apply a "tuck-in" or external type sleeve, such as the sleeve 41 (FIGURE 25), to the opened valve, the sleeve feeding mechanism is adapted to transversely crease the sleeve blanks to thereby form a fold 77, as more fully discussed in this Hollis patent.

To apply the thus folded external sleeve 41 to the opened valve corner of the bag tube 35, there is provided a sleeve applying mechanism 80 which is best shown in FIGURES 1, 13 and 14. The sleeve applying mechanism 80 is positioned on the machine adjacent the opened valve corner and includes two tucker members 83 and 84 which constantly rotate in a clockwise direction, as viewed in FIGURE 14, and are adapted to receive the blank for the sleeve 41 from the feeding mechanism. The sleeve blank is clamped in position adjacent the tucker members, and as these members rotate, they approach the positions shown in FIGURES 17 and 18, at which time the leading portion of the sleeve blank is adhesively affixed behind the upstanding lip 72 of the valve flap and the blank is released. As the tucker members 83 and 84 continue their clockwise rotation, they are each outwardly rotated in a transverse direction (FIGURES 19 and 20) at a relatively rapid rate to thereby effect retraction of these members from behind the valve lip without imposing any substantial downwardly directed force thereon.

During the time the tucker members 83 and 84 are effective to position the leading portion of the blank for the external sleeve 41 behind the valve lip, the remaining blank portion is engaged by two arcuate wires 85 and 86, and as the tucker members are retracted, these wires continue to move clockwise and drag along this blank portion to thereby urge it into contact with the outer face of the opened valve. As best shown in FIGURES 9 and 21, the valving and creasing mechanism 65 is provided with a creasing finger 87 which oscillates in a vertical plane and is adapted to engage the remaining sleeve portion in contact with the outer valve face, thereby forming a median crease in the sleeve and holding it in position until the wings 66 and 67 and the gusset clamp plates 68 and 69 are effective to fold the valve toward its closed position (FIGURES 22).

Upon the return of the wings 66 and 67 and the clamp plates 68 and 69 to their initial positions, the valve corner of the bag is released thereby to permit removal of the bag tube. As best shown in FIGURE 5, the guide members 59 on the outfeed side of the machine are adapted to automatically pivot toward a discharge mechanism indicated generally at 89 in response to the release of the bag tube, as indicated by the broken lines in this figure. A plurality of nozzles 90 direct jets of air against the side wall 36 of the valved and sleeved bag tube 35 and thereby urge the bag tube into engagement with the pivoted guide members 59. As the tube engages these guide members, the upper tube edge rests against three outfeed rollers 91 which are in operative relationship with three rotary outfeed sectors 92. Upon the rotation of the rollers 91 and the sectors 92, the sectors engage the valved and sleeved bag tube on the rollers and withdraw the tube from its substantially vertical position in the guideway 57 to a horizontal position.

The valved and sleeved bag tube is then advanced toward a pair of outfeed rollers 93 and 94 (FIGURE 1) which exert additional creasing pressure on the formed and sleeved valve. The bag tube is then advanced onto a discharge conveyor 95 and is led to a suitable sewing mechanism (not shown) for applying the stitching 43 to close the ends of the tube and thus form the completed valved and sleeved bag.

A detailed description of the machine will now be set forth.

*Infeed Mechanism*

As best shown in FIGURES 1 through 6, the infeed mechanism 45 includes a pair of longitudinal channel members 100 which serve as a support for the table 44 and are in turn suitably supported by legs 101. A pair of spaced angles 102 are inwardly disposed adjacent each of the members 100 and extend in a longitudinal direction from the table 44 to a main frame indicated generally at 103. Journaled in the channel members 100 adjacent the table 44 is a transverse shaft 104 which extends beneath the angles and is provided with two chain sprockets 105 and 106. These sprockets are each disposed between adjacent angles 102 and are adapted to rotate with the shaft 104. A second transverse shaft 107 is journaled in the frame 103 beneath the angles 102 and similarly supports two chain sprockets 108 and 109.

An endless feed chain 115 is disposed around the sprockets 105 and 108, while the sprockets 106 and 109 similarly are provided with an endless feed chain 116. The feed chains 115 and 116 are adapted to be rotated in a clockwise direction, as viewed in FIGURE 1, by a sprocket 110 which is affixed to the shaft 107 and is driven by a main drive chain 111, in a manner that will become more fully apparent hereafter. Mounted on each of the chains 115 and 116 is one of the lugs 46 which in its upstanding position is adapted to engage the rearwardly disposed gusset 40 of the bag tube 35 as it is removed from the table 44 and positioned on the chains 115 and 116. To facilitate the positioning of the bag tube on the chains, there is provided a longitudinal end stop 117 (FIGURE 2) which is affixed to two transverse rods 118 adjustably supported by the angles 102 adjacent the feed chain 116. The stop 117 is adapted to receive the open end of the tube opposite the end including the extension 38. As the lugs 46 and their chains move forward in response to rotation of the drive sprocket 110, the bag tube 35 is advanced toward the frame 103 and the feed rollers 47 and 48.

A mounting block 120 is fixedly secured to the outer angle 102 adjacent the chain 115, as best shown in FIGURE 3. The block 120 rotatably supports a transverse shaft 121 which is provided with a sprocket 122 adjacent one end thereof and a bevel gear 123 at the other end. The sprocket 122 is interposed between the reaches of the feed chain 115 and is driven thereby, while the bevel gear 123 is in meshing engagement with a bevel gear 124 mounted intermediate the ends of a vertically disposed shaft 125 rotatably supported at the outer end of the block 120. A horizontal circular plate 126 is affixed to the upper end of the shaft 125 and is provided with the pusher roller 49 which is eccentrically positioned on the plate 126 and is adapted to momentarily engage the adjacent open end of each bag tube 35 as it is advanced toward the feed rollers 47 and 48. Thus, upon the clockwise rotation (FIGURE 1) of the feed chain 115, the sprocket 122 likewise rotates in a clockwise direction, thereby rotating the shaft 121, bevel gears 123 and 124, the shaft 125 and the roller plate 126. The timed relationship between the forward movement of the lugs 46 and the rotation of the plate 126 is such that, as the extension 38 on the bag tube passes the pusher roller 49, the pusher roller is spaced therefrom. After the extension 38 has passed the roller 49, however, the roller is moved by the rotating plate 126 to its dotted line position (FIGURE 3), where it engages the adjacent open end of the tube and urges the tube toward the opposite side of the feed mechanism. It should be noted that at this time the opposite open end of the advancing bag tube has cleared the stop 117. Each successive bag tube on the feed mechanism is thus aligned in a manner such that the tube ends adjacent the extensions 38 are uniformly disposed along a longitudinally extending line.

The feed rollers 47 are mounted on a transverse shaft 130 and are in engagement with the corresponding feed rollers 48 positioned on a transverse shaft 131. The shaft 130 is rotatably supported between two longitudinally extending upper frame members 132 which form a part of the frame 103, while the shaft 131 is similarly supported by two frame extensions 133 depending from the members 132. Rigidly affixed to the feed roller shaft 131 are three equally spaced sprockets 134 which, as best shown in FIGURE 4, respectively engage the chains 51, 52 and 53. These chains pass over the sprockets 134 and around three idler sprockets 135 (FIGURES 1 and 5) mounted on a transverse shaft 136 which is disposed slightly below the shaft 131 and on the side thereof opposite the drive sprocket shaft 110. The chains 51, 52 and 53 then extend downwardly along their vertical reaches 54, 55 and 56 to three sprockets 137 on a transverse shaft 138 which is positioned adjacent the lower portion of the frame 103 and is supported adjacent its ends by two upstanding brackets 139 mounted on longitudinally extending lower frame members 140. The brackets 139 additionally serve as a support for a chain drive shaft 141 which is disposed parallel to and immediately above the shaft 138 and is adapted to rotate the shaft 138 by means of two meshing spur gears 142 and 143 (FIGURE 4). The shafts 138 and 141 extend through suitable bearings in two centrally located upstanding brackets 144, one of which includes an elongated bracket portion 145 which forms an extension thereof. The bracket portion 145 is provided with a bearing 146 adjacent its upper end which accommodates the feed roller shaft 131, and a horizontally extending bracket 147 is affixed to the bracket portion 145 immediately beneath the bearing 146 and serves as a support for the idler shaft 136. Respectively affixed to the left hand bracket 139, as viewed in FIGURE 4, and to the two centrally located brackets 144 adjacent the chain drive shaft 141 are three adjustable brackets 148, 149 and 150 which each support a stub shaft 151 (FIGURE 1) having an idler sprocket 152 mounted thereon. The chains 51, 52 and 53 pass around the lower sprockets 137 on the shaft 138, over the idler sprockets 152, and then return to the sprockets 134 on the feed roller shaft 131.

As indicated heretofore, the chains 51, 52 and 53 are each provided with one of the gripper mechanisms 50 (FIGURES 4, 5 and 6). The mechanism 50 comprises an elongated arcuate member 155 which is pivotally affixed adjacent the central portion thereof to the corresponding chain by a pin 156. Rigidly mounted adjacent one end portion of the member 155 is a pin 157 to which is secured one end of a coil spring 158. The spring 158 extends from the pin 157 around the pivot pin 156 and is fastened at its other end to a clamping member 160 affixed to the chain on the trailing side of the pivot pin.

The end portion of the gripper member 155 opposite that including the pin 157 serves as a clamp for the leading edge of the bag tube, and as the member 155 moves upwardly toward the lower feed roller shaft 131 in response to clockwise rotation (FIGURES 5 and 6) of the chain, this end portion is urged by the spring 158 into engagement with the clamping member 160. As the gripper member 155 approaches the shaft 131, the outer arcuate surface of the gripper member engages a sleeve 159 which is positioned on the lower feed roller shaft 131. The advancing member 155 strikes this sleeve and pivots about the pin 156 against the tension of the spring to its open position, as shown by full lines in FIGURES 5 and 6. As the leading gusseted edge of each of the bag tubes 35 passes between the feed rollers 47 and 48, this bag edge is disposed between the open clamping end of each of the gripper members 155 and the mating member 160. As the opposite end of each gripper member rides over its corresponding sleeve 159, it is rotated in a counterclockwise direction, as viewed in FIGURES 5 and 6, by the spring 158 to its clamping position, as shown by dotted lines in FIGURE 5. The leading edge of each successive bag tube is firmly grasped by the gripper mechanisms, and as the chains 51, 52 and 53 advance, the bag tube is drawn from between the feed rollers 47 and 48 to the vertically disposed guideway 57 formed by the guide members 58 and 59.

As indicated heretofore, the downward movement of the bag tube 35 in the guideway 57 is arrested by the stop 60. The chains 51, 52 and 53 and their corresponding gripper mechanisms 50 continue to advance, and the leading gusseted edge of the bag tube is withdrawn from between the mating gripper members 155 and 160. The valve corner of each successive bag tube 35 on the stop 60 is uniformly disposed in a predetermined position for the valving and sleeving operations.

The stop 60 extends in a transverse direction, and the three guide members 58 are each affixed thereto at their lower ends, as best shown in FIGURES 1 and 7. The stop is supported by two blocks 165 which are respectively secured to the upper ends of a pair of vertically disposed racks 166 extending through the adjacent frame members 140. Each of the racks 166 accommodates a pinion 167 mounted on a transversely extending shaft 168 which is journaled in these frame members and is provided at one end thereof with an adjusting handle 170. To adjust the position of the valve corner of each bag tube on the stop 60, the handle 170 is rotated to similarly rotate the pinions 167 in engagement with the racks 166. The racks 166 move in a vertical direction to thereby vary the position of the stop member 60.

Valving and Creasing Mechanism

The valving and creasing mechanism 65 is best illustrated in FIGURES 9–12 and includes a pair of spaced frame members 200 which extend upwardly from a base 201 (FIGURE 8) of the main frame 103 beneath the valve corner of the bag tube 35 on the stop 60. A transverse block 202 (FIGURE 11) interconnects the upper ends of the members 200 and is provided with a centrally disposed vertical bore 203 through which extends a rotatable sleeve 204. The sleeve 204 is supported in the bore 203 by an upper flange 205, and the lower end of the sleeve projects below the block 202 and is affixed to a bevel gear 206. Rotatably disposed within the sleeve 204 is a hollow shaft 207 which is substantially longer than the sleeve and extends downwardly therefrom. The lower end of the shaft 207 is affixed to a bevel gear 208 which is rotatably positioned in a lower transverse block 209 mounted between the frame members 200. The bevel gears 206 and 208 are each in meshing engagement with an intermediate bevel gear 210 on a transverse shaft 211 extending through one of the frame members 200.

A pair of symmetrically opposed support members 215 and 216 are positioned above the upper surface of the flange 205 of the sleeve 204. The support member 215 is welded or otherwise rigidly affixed to this flange surface, while the support member 216 is similarly secured to the outer cylindrical surface of the hollow shaft 207. As best shown in FIGURE 10, the support members 215 and 216 are of substantially U-shaped cross-section and respectively accommodate two blocks 217 and 218 which are each pivotally affixed adjacent the lower end thereof to the corresponding support member by a pivot pin 219 (FIGURE 11). The gusset clamp plate 68 extends upwardly from the block 217 and in its closed (FIGURE 11) position is in spaced, juxtaposed relationship with the gusset clamp plate 69 which extends in an upward direction from the block 218. Positioned between the legs of each of the support members 215 and 216 is a pin 220 which is parallel to the corresponding clamp plate pin 219 and pivotally supports an upstanding C-shaped wing bracket 221 adjacent the lower end thereof. The upper ends of the brackets 221 are respectively affixed to the wings 66 and 67 which in their closed positions extend upwardly on opposite sides of the clamp plates 68 and 69. The clamp plates 68 and 69 and the wings 66 and 67 are each of triangular configuration, and the size of the clamp plates is relatively small when compared with that of the wings.

Axially disposed within the hollow shaft 207 is a pull rod 225 (FIGURE 9). The upper end of the pull rod is provided with a flanged head 226 which overlies the inwardly extending lower portions of the C-shaped brackets 221. One end of an upstanding leaf spring 229 is fixedly secured to each of the clamp plate blocks 217 and 218 above their pivot pins 219, and the opposite end of the spring 229 extends upwardly into engagement with the inner central portion of the corresponding wing bracket 221. The springs 229 urge the blocks 217 and 218 and their clamp plates 68 and 69 inwardly about the pivot pins 219 and additionally serve to bias the brackets 221 and their wings 66 and 67 in an outward direction about the pins 220. In the position shown, however, the wings and brackets are restrained from outward movement by the head 226 of the pull rod 225 which engages the lower bracket portions and thereby prevents outward movement of the wings.

The pull rod 225 extends downwardly through the lower block 209, and the lower end of the rod engages one end of a follower arm 235. The arm 235 is adapted to pivot intermediate its ends about a pin 236 connected between the frame members 200, and the other end of the arm is provided with a follower 237 in engagement with a rotary cam 238 on a drive shaft 240 for the valving and creasing mechanism 65. The drive shaft 240 is longitudinally positioned above the base 201 of the machine and extends through a bushing 241 in the lower end of each of the frame members 200.

The support members 215 and 216 for the gusset clamp plates and the wings are adapted to rotate in opposite directions about the vertical axis of the bore 203 through approximately a ninety degree arc under the control of a cam 242 (FIGURE 11) affixed to the drive shaft 240. The cam 242 is provided with a cam follower 243 which is adapted to oscillate a gear segment 244 pivotally connected by a stud 245 to the left hand frame member 200. The gear segment 244 is in meshing engagement with a spur gear 247 on the drive shaft 211 for the intermediate bevel gear 210.

As best shown in FIGURE 9, the drive shaft 240 is provided with a cam 250 which controls the creaser blades 75 and 76. An upwardly extending arm 251 is pivotally mounted on a bracket 253 affixed to one of the frame members 200 and is provided with a follower 254 at the lower end thereof which engages the cam 250. The arm 251 controls a gear segment 255 in meshing engagement with a spur gear 256 which is mounted adjacent one end of a transverse rock shaft 257 rotatably disposed in the frame members 200. Fixedly secured at the ends of the shaft 257 are two elongated rods 259 and 260 which, in the position shown in FIGURES 9 and 11, are angularly disposed in a downward direction and are respectively provided with the creaser blades 75 and 76 adjacent their lower ends. A vertically disposed coil spring 265 is affixed at one end thereof to the rod 259 by means of a bracket 266 mounted thereon immediately below the shaft 257 and at the other end to a spring support 268 secured to the bracket 253. The spring 265 serves to bias the rods 259 and 260 and their creaser blades 75 and 76 in a counterclockwise (downward) direction, as viewed in FIGURE 9, and urge the cam follower 254 against its cam 250.

The creasing finger 87 includes a substantially straight creasing edge 270 which is adapted to rotate in a vertical plane from its lowered position shown in FIGURES 9 and 11 to an upright position, as illustrated in FIGURES 21 and 30. A bifurcated arm 271 is fastened at one end thereof to the finger 87, and the other end of the arm is pivotally secured, as at 272, to a bracket 273 affixed to the upper block 202. The arm 271 is provided intermediate its ends with a pin 274 which is adapted to engage the upper C-shaped end of a vertically disposed slide member 275. The member 275 extends downwardly from the pin 274 and is provided adjacent its lower end with a cam follower 276 (FIGURE 11) which rides over a cam 277 mounted on the shaft 240 between the frame members 200.

As best shown in FIGURE 8, the drive shaft 240 for the valving and creasing mechanism 65 is additionally provided with a cam 280 which is longitudinally spaced from the frame members 200 and is adapted to control the movement of a cam follower 281 affixed to one end of an arm 282. The opposite end of the arm 282 is pivotally secured to a bracket 283 which extends outwardly from an air valve schematically illustrated at 284. The valve 284 is mounted on the base 201 and includes an outlet conduit 285 and an intake conduit 286 which is supplied from a suitable source (not shown) of air under pressure. A valve arm 287 is pivotally connected intermediate the ends of the follower arm 282 and is adapted to control the valve 284 to admit air from the conduit 286 to the conduit 285 in response to rotation of the cam 280. The outlet conduit 285 is suitably connected to the lower end of the pneumatic tube 70 (FIGURE 9), although for purpose of clarity this connection has not been shown in the drawings. The tube 70 is affixed to the valving and creasing mechanism 65 adjacent the lowered position of the creasing finger 87 by a bracket 288, and the tube extends upwardly toward the wings 66 and 67 and the gusset clamp plates 68 and 69.

It will of course be appreciated that the angular position of each of the various cams on the shaft 240, the contour and throw of these cams, and the ratios of the various gears and gear segments in the valving and creasing mechanism 65 are all synchronized in properly timed relation.

As the shaft 240 is rotated, in a manner to be more fully described hereafter, the air jet cam 280 thereon actuates the valve arm 287 to thereby admit a jet of air under pressure from the intake conduit 286 through the outlet conduit 285 to the tube 70 and its nozzle 71. The operation of the infeed mechanism 45 is timed such that the gripper mechanisms 50 draw the bag tube 35 downwardly along the guideway 57 as air is applied to the nozzle 71. The jet of air striking the lower gusset 39 adjacent the valve corner of the bag tube opens this gusset and thereby greatly facilitates the positioning of the gusset clamp plates 68 and 69 therebetween. At the time the air jet is effective to open the gusset 39, the pull rod 225 is out of engagement with the lower portions of the C-shaped wing brackets 221, and the springs 229 have pivoted the wings 66 and 67 about the pins 220 from the positions shown in FIGURES 9 and 11 to their open positions. In these latter positions the upper ends of the wings are spaced apart to receive the valve corner of the bag tube as the tube comes to rest against the stop 60, at which time the rotating cam 280 closes the air valve 284.

As the pull rod cam 238 rotates on the shaft 240, the follower 237 actuates its arm 235 to thereby urge the pull rod 225 downwardly into engagement with the lower portions of the wing brackets 221. These brackets and their wings 66 and 67 pivot inwardly about their pins 220 to the positions shown in the drawings, and the wings engage the adjacent portions of the bag tube side walls 36 and 37, thereby firmly clamping the valve corner of the bag and holding it in its clamped position until the completion of the valving and sleeving operations. As the wings rotate inwardly, their movement is resisted by the upper ends of the leaf springs 229, and the lower ends of these springs act against the clamp plate blocks 217 and 218 to thereby urge the clamp plates 68 and 69 in an inward direction about their pins 219.

Upon the clamping of the bag tube by the wings 66 and 67, the cam 242 on the shaft 240 initiates oscillation of the gear segment 244 to thereby rotate the spur gear 247, the shaft 211 and the bevel gear 210. As the bevel gear 210 rotates, the bevel gear 206 on the sleeve 204 rotates this sleeve in one direction through a ninety degree angle, thereby similarly rotating the support member 215 and the wing 66 and clamp plate 68 affixed thereto. The intermediate bevel gear 210 also rotates the bevel gear 208 and its shaft 207 through a ninety degree angle in an opposite direction, thus similarly rotating the support member 216 and the wing 67 and clamp plate 69. The wings and clamp plates open to the position shown in FIGURES 15 to 20, and the lip 72 of the opened valve is disposed along a substantially straight line in position to receive the insert blank for the sleeve 41.

With the bag valve in its thus opened position, the creasing blade cam 250 on the shaft 240 moves its follower 254 to the right, as viewed in FIGURE 9, thereby moving the gear segment 255 in the opposite direction to rotate the rock shaft 257. The shaft 257 rotates in a clockwise direction and urges the creasing blades 75 and 76 upwardly from the position shown in FIG-URE 9 to that illustrated in FIGURES 15 and 16. In this latter position, the blades 75 and 76 engage the open valve corner of the bag tube and crease it between the blades and the upstanding wings and clamp plates. The cam 250 then rotates the shaft 257 in the opposite direction to return the creasing blades to their initial (FIGURE 9) position.

As will be more fully explained hereafter, the sleeve applying mechanism 80 then affixes the sleeve 41 behind the upstanding lip 72 of the opened valve. After the sleeve has been inserted in position, the cam 277 on the drive shaft 240 for the valving and creasing mechanism 65 actuates the follower 276 to thereby move the slide member 275 in an upward direction, as viewed in FIGURE 9. The C-shaped upper end of the member 275 acts against the pin 274 to rotate the bifurcated arm 271 in a clockwise direction about the pin 272, thereby similarly rotating the creasing finger 87. The edge 270 of the finger 87 moves upwardly and engages the outer portion of the sleeve 41, as best shown in FIGURE 21. During this time, the cam 242 is effective to initiate the closing of the wings 66 and 67 and the clamp plates 68 and 69. As the wings and clamp plates close, the valve and its sleeve are medially creased by the finger 87 and are folded inwardly to their closed position. The cam 277 is then effective to lower the slide member 275 and thereby return the creasing finger 87 to its initial (FIGURE 9) position.

Upon the completion of the closing of the sleeved valve, the cam 238 on the shaft 240 returns the pull rod 225 to its upper position, and the leaf springs 229 open the wings 66 and 67 and thereby release the valve corner of the bag.

*Sleeve Applying Mechanism*

The sleeve applying mechanism 80 is adapted to be driven by the longitudinal shaft 82 which is rotatably supported by vertical legs 301 forming a part of the frame 103. The shaft 82 extends in a direction parallel to that of the valving and creasing mechanism drive shaft 240 and is driven at a constant speed by a sprocket 302 (FIGURES 8 and 13), in a manner that will become more fully apparent hereafter. As best shown in FIGURES 1, 13 and 14, the mechanism 80 includes two elongated frame members 303 which are spaced apart on the shaft 82 and are adapted to rotate therewith in substantially parallel relationship with each other. One end of each member 303 is affixed to a sleeve 304 disposed round the shaft 82, and the sleeve is secured to the shaft by an adjustable clamp 305. The frame members 303 each include an offset portion 309 which extends inwardly from adjacent the opposite end of the frame member and accommodates a bracket 310 adjustably secured thereto, as by screws 311. Each bracket 310 includes a relatively short rod 312 extending inwardly therefrom in a direction parallel to the drive shaft 82 which is adjustably affixed to a clamp 313 rigidly secured to a substantially flat clamping plate 314. The clamping plates 314 are spaced from each other in a single plane and are adapted to rotate with the frame members 303 in a clockwise direction, as viewed in FIGURE 14. Mounted on each of the clamping plates 314 is an elongated bracket 315 which supports a pin 316, the inner end of which is secured to one of the arcuate wires 85 and 86. Each of these wires extends outwardly with respect to the shaft 82 and is urged in a clockwise direction with respect to the corresponding pin by means of a coil spring 318.

Each of the offset portions 309 of the frame members 303 is provided with a bore 320 which extends in a direction transverse to the drive shaft 300 and accommodates a rotatable shaft 321. The shafts 321 are longer than the corresponding bores 320, and their outer ends are respectively secured to the inwardly extending tucker members 83 and 84. Each of the members 83 and 84 is removably secured to its shaft 321 by a set screw 322 and includes a first portion 323 disposed in a plane perpendicular to the corresponding shaft 321 and a second portion 324 which meets the first portion at a right angle.

A bevel gear 325 is mounted on the inner end of each of the shafts 321 and is in meshing engagement with a bevel gear 326 at one end of a shaft 327 which is rotatably supported by the corresponding frame member 303 and is substantially parallel to the drive shaft 82. Also mounted at this end of the shaft 327 is a spur gear 328 which engages a spur gear portion 329 formed at one end of an elongated clamping member 330. The member 330 is pivotally supported adjacent its spur gear portion by the offset portion 309 of the adjacent frame member 303 and, in the position shown in FIGURES 13 and 14, extends upwardly toward the corresponding clamping plate 314 in a direction substantially parallel to that of the shaft 321. The end of the clamping member 330 adjacent the corresponding clamping plate is provided with a transverse clamping pin 331.

The shaft 327 for the gears 326 and 328 extends through the frame member 303 thereadjacent and, as best shown in FIGURE 14, is fixedly secured at its outer end to one end of an arm 335, the other end of which is provided with a cam follower 336. The cam follower 336 engages a fixed cam 337 which is mounted on a sleeve 338 disposed around the shaft 82. The sleeve 338 is secured to the adjacent leg 301 (FIGURE 1) of the frame 103 to thereby prevent its rotation with the shaft 82.

The cam 337 comprises two substantially flat sections 340 and 341 which are disposed in abutting, adjustable relationship with each other and together form a cam surface for the follower 336. This cam surface includes a first substantially circular arc portion 342 (FIGURE 14) and a second substantially circular arc portion 343 of smaller diameter. The portion 343 extends around the periphery of the cam for approximately two hundred and seventy degrees, while the cam portion 342 transcribes approximately a ninety degree arc.

As more fully described in Hollis Patent 2,809,569 referred to heretofore, the sleeve feeding mechanism (not shown) is adapted to feed successive insert blanks for the sleeve 41 to the sleeve applying mechanism 80 as it rotates about the shaft 82. At the time an insert blank is received by the mechanism 80, the cam followers 336 are in engagement with the corresponding portions 343 of the cams 337, and the shafts 327 have rotated in a counterclockwise direction from the position shown in FIGURE 14. The spur gears 328 thereon likewise have rotated, and the pins 331 on the clamping members 330 have moved away from the corresponding clamping plates 314. The sleeve feeding mechanism is adapted to position a sleeve insert blank between the plates 314 and the clamping pins 331. The cam followers 336 then ride onto the corresponding portions 342 of the cams 337 to thereby move the clamping members 330 and the pins 331 to the position shown in FIGURE 14. In this position, the insert blank 41 is firmly grasped intermediate the ends thereof between the pins 331 and the clamping plates 314, and the portion of the insert blank including the fold 77 is in engagement with the undersurfaces of the tucker member portions 323 while the remaining portion of the blank extends downwardly adjacent the clamping plates.

Upon continued clockwise rotation of the sleeve applying mechanism 80 about the shaft 82, each cam follower 336 rides over the portion 342 of its cam 337, and the corresponding shaft 327, the gears 326 and 328, and the clamping member 330 remain fixed relative to the rotating frame members 303 and the clamping plates 314. As the mechanism 80 rotates, the outer end elements thereof reach the position shown in FIGURE 17, and the tucker members 83 and 84, together with the leading portion of the sleeve blank 41, are inserted behind the upstanding lip 72 of the opened bag valve. Continued rotation of the mechanism 80 about the shaft 82 allows each cam follower 336 to be urged by a biasing coil spring 326' on the corresponding shaft 327 from the portion 342 of the cam 337 onto the cam portion 343. The shafts 327 are thereby rotated in a counterclockwise direction relative to the frame members 303, and the spur gears 328 thereon cause the clamping members 330 to pivot about their spur gear portions 329 and move the pins 331 out of clamping engagement with the sleeve 41 to their open positions, as best shown in FIGURE 18.

Simultaneously with the opening of the clamping members 330, the bevel gears 326 are responsive to the rotation of their shafts 327 to rotate the corresponding bevel gears 325 and the shafts 321. The shafts 321 rotate transversely in opposite directions, and the tucker members 83 and 84 are likewise rotated and are quickly withdrawn from behind the sleeved valve. The valving and creasing mechanism 65 is then effective to crease and close the sleeved bag valve in the manner indicated heretofore.

*Internal Type Sleeves*

As indicated heretofore, the feeding, valving and sleeving machine is readily adaptable for the formation of an internal type sleeve, such as the sleeve 42 shown in FIGURES 27 through 31 of the drawings, on the valve corner of the bag tube 35. To accomplish this adaptation, the screws 311 (FIGURE 13) for the brackets 310 are loosened, and these brackets, together with the associated clamping plates 314 and the wires 85 and 86, are removed from the sleeve applying mechanism 80. The set screws 322 for the tucker members 83 and 84 likewise are loosened, and the tucker members are slid off their shafts 321 and are each replaced by an alternative tucker member 350 (FIGURES 27-29) which includes two substantially flat portions 351 and 352. The portion 351 of each tucker member 350 is disposed in a plane perpendicular to the axial direction of the corresponding shaft 321, while the portion 352 meets the portion 351 at an obtuse angle and, in the position shown in FIGURE 27, extends rearwardly adjacent the clamping pin 331.

The sleeve feeding mechanism (not shown) is adapted to apply adhesive to a portion of the insert blank for the internal type sleeve 42 and to feed the blank to the rotating sleeve applying mechanism 80. The blank for the sleeve 42 may be substantially the same as that for the sleeve 41, although it need not include the transverse fold 77. The internal sleeve insert blank is led to a position adjacent the tucker members 350, and as the clamping members 330 move to their closed position, the insert blank is firmly clamped intermediate its ends between the clamping member pins 331 and the rearwardly extending portions 352 of the tucker members. Upon the continued clockwise rotation of the sleeve applying mechanism 80 about its shaft 82, the leading portion of the insert blank for the sleeve 42 is positioned by the tucker member portions 351 behind the upstanding lip 72 of the opened bag valve and is adhesively affixed thereto, as shown in FIGURE 27. At this time, the remaining portion of the insert blank extends rearwardly in a substantially horizontal plane. Continued rotation of the sleeve applying mechanism 80 causes the cams 337 (FIGURES 13 and 14) to become effective to move the clamping members 330 in a clockwise direction relative to the tucker members 350, as shown by the arrow in FIGURE 28, to thereby release the insert blank. The cams 337 also initiate the rapid rotation of the tucker member shafts 321 in opposite directions to thereby remove the tucker members from behind the valve lip. Upon the removal of the tucker members, the trailing portion of the blank for the sleeve 42 extends outwardly away from the outer face of the valve and is in substantially coplanar relationship with the leading blank portion.

The creasing finger 87 is then effective to move the trailing portion of the insert blank for the internal type sleeve 42 upwardly toward the open end of the bag tube 35 above the valve lip, as best shown in FIGURE 29. As the insert blank is medially creased (FIGURE 30), the wings 66 and 67 and the clamp plates 68 and 69 of the valving and creasing mechanism 65 close to complete the valving and sleeving operation.

*Discharge Mechanism*

The three outfeed rollers 91 (FIGURES 1, 5 and 7) of the discharge mechanism 89 are keyed or otherwise rigidly affixed to a horizontal transverse shaft 400 which is angularly spaced in a downward direction from the upper ends of the guide members 59 and is rotatably supported by two upstanding brackets 401 and 402. These brackets extend downwardly from the shaft 400 and are secured at their lower ends to a transverse tie member 404. As best shown in FIGURE 7, the ends of the tie member 404 are respectively affixed to the bottom portions of two vertically disposed slides 403 which are each mounted in one of the legs 301 on the outfeed side of the main frame 103.

A transverse rock shaft 405 is journaled between the brackets 401 and 402 beneath the outfeed roller shaft 400 and is provided with three spaced arms 406 which are each fixedly secured at one end thereof to the shaft 405. The arms 406 respectively serve as supports for the guide members 59, and the opposite ends of the arms are pivotally affixed thereto, as at 407. Also mounted on the rock shaft 405 is one end of a follower arm 408 (FIGURE 5), the other end of which is provided with a cam follower 409 in engagement with a cam 410 on the outfeed roller shaft 400.

The outfeed sectors 92 are equally spaced along a transverse shaft 425 which is disposed above the outfeed roller shaft 400 and is supported adjacent its ends by two horizontal brackets 426 and 427 in rigid relationship with the upper ends of the slides 403. The sectors 92 are of relatively large radius and are adapted to engage the corresponding outfeed rollers 91 upon the rotation of the shafts 400 and 425. These shafts are driven in opposite directions by the main drive chain 111 through drive sprockets 435 and 436 respectively affixed to the shafts, as will become more fully apparent hereafter.

Extending between the legs 301 adjacent the right hand side of the main frame 103, as viewed in FIGURE 1, are two transverse shafts 440 and 441 which respectively support the creaser rollers 93 and 94. Each end of the shaft 440 is journaled in an upper block 442 (FIGURE 7) supported in a vertical recess 443 in the adjacent leg 301, while a lower block 444 similarly supports each end of the shaft 441 and is held in adjustable spaced relationship with the block 442 in the corresponding recess by a bolt 445. The roller 93 is mounted adjacent one end of its shaft 440 and is adapted to engage the roller 94 which is similarly secured adjacent the corresponding end of the shaft 441. The nip formed between these rollers is in position to receive the valved and sleeved corner of each successive bag tube 35 as it is advanced therethrough.

Three grooved pulleys 450 are mounted on the shaft 441 and each accommodate an expandable belt 451 which extends around a groove 452 in the corresponding outfeed roller 91 on the shaft 400. The lower creaser roller 94 is similarly grooved to accommodate an additional expandable belt 451 which is disposed around a grooved pulley 453 affixed to the adjacent end of the shaft 400. The upper horizontal reaches 454 (FIGURE 1) of the expandable belts 451 serve as a support for each successive bag tube 35 as it is advanced from the outfeed rollers 91 to the creaser rollers 93 and 94. The creaser roller shafts 440 and 441 are adapted to be driven in opposite directions by the discharge conveyor 95 and are interconnected by a spur gear 456 (FIGURE 7) on the shaft 440 which is in meshing engagement with a spur gear 457 on the shaft 441.

As best shown in FIGURE 4, the portion 145 of the upstanding bracket 144 includes a clamping member 415 intermediate its ends which supports an elongated, transverse conduit 416. The five nozzles 90 are equally spaced along this conduit and are directed toward the outfeed side of the machine. A flexible conduit 417 is affixed at one end to the conduit 416 and at the other end to an air valve 418 which is mounted at the upper end of the left hand support bracket 139. The air valve 418 is provided with an intake conduit 419 supplied from a suitable source of air under pressure and is controlled by a valve arm 420 which engages a cam 421 on a stub shaft 422 journaled in the support bracket 139 below the air valve. A spur gear 423 on the shaft 422 is in meshing engagement with a pinion 424 on the gripper chain drive shaft 141. As the drive shaft 141 rotates, the arm 420 is actuated by the cam 421 to open and then close the valve 418 immediately after the wings 66 and 67 of the valving and creasing mechanism 65 have opened to release the valved and sleeved bag tube 35 on the stop 60, thereby supplying air under pressure through the conduits 419, 417 and 416 and out through the nozzles 90.

Simultaneously with the opening of the valve 418, the cam 410 (FIGURE 5) on the outfeed roller shaft 400 causes its follower arm 408 and the rock shaft 405 to rotate in a counterclockwise direction, as viewed in FIGURE 5, to the position shown by broken lines in this figure. The guide member support arms 406 are similarly rotated, and the guide members 59 pivot slightly about the points 407 and move in a downward direction. The guideway 57 thereby opens, and the upper ends of the guide members 59 are disposed immediately adjacent the outfeed roller shaft 400. The jets of air from the nozzles 90 urge the valved and sleeved bag tube 35 in the guideway 57 against the guide members 59 as they open, and the upper gusseted edge of the tube is moved into abutting relationship with the outfeed rollers 91. As the rollers 91 and the outfeed sectors 92 rotate, they engage this edge of the bag tube 35 and draw the tube upwardly out of the guideway 57 and onto the upper reaches 454 of the expandable belts 451, thus moving each successive tube from its vertical position in the guideway to a substantially horizontal position. The bag tube is then advanced toward the creaser rollers 93 and 94 (FIGURES 1 and 7) which exert additional creasing pressure on the valved and sleeved tube to thereby insure that the various folds and creases formed during the valving and sleeving operation are maintained. This additional creasing pressure quickly and easily may be adjusted by rotating the bolts 445 to vary the spacing between the blocks 442 and 444 in each recess 443, thereby varying the spacing between the shafts 440 and 441 and their creaser rollers. As each bag tube 35 is advanced through the creaser rollers, it passes onto the discharge conveyor 95 and is led thereby to the sewing mechanism (not shown). The guide members 59 remain in their open position until the next successive bag tube has been led by the infeed mechanism 45 to the stop 60. At the time the wings 66 and 67 of the valving and creasing mechanism 65 are closed to clamp this successive bag tube, the cam 410 on the outfeed roller shaft 400 is effective to return the guide members 59 to their initial position.

As indicated heretofore, bag feeding, valving and sleeving machines constructed in accordance with the illustrated embodiment of the invention are adapted to perform feeding, valving and sleeving operations on gusseted bag tubes of widely varying dimensions. Thus, the operation of machines constructed in accordance with this embodiment is substantially independent of the length of the bag tubes, and the infeed mechanism pusher roller 49 and associated parts serve to align the valve end of each successive tube along a predetermined line preparatory to the valving and sleeving thereof. To adapt the machine for bag tubes of varying widths, the discharge mechanism 89 is provided with an adjusting handle 460

(FIGURES 1 and 7) which upon rotation is adapted to raise or lower the positions of the guide members 59, the outfeed rollers 91 and the outfeed sectors 92 relative to the stop 60.

The handle 460 is affixed to the upper end of a threaded shaft 461 which extends downwardly through the upper portion of the main frame 103 and through a tapped bore 462 in the bracket 427 for the outfeed sector shaft 425. The bracket 426 for this shaft similarly is provided with a tapped bore 463 which accommodates a threaded shaft 464 extending upwardly through the adjacent portion of the main frame. A horizontal sprocket 465 is affixed to the upper end of the shaft 464 and is driven by a chain 466 disposed around the sprocket 465 and a sprocket 467 horizontally mounted adjacent the upper end of the shaft 461. As indicated heretofore, each of the brackets 426 and 427 is in rigid relationship with the upper ends of the vertical slides 403, and the lower ends of these slides are affixed to the tie member 404 for the outfeed roller shaft brackets 401 and 402.

In order to accommodate bag tubes of relatively narrow width, for example, the handle 460 is rotated in one direction to similarly rotate the shafts 461 and 464, thereby moving the brackets 426 and 427 downwardly and lowering the shaft 425 and the outfeed sectors 92 thereon. Downward movement of the brackets 426 and 427 also urges the slides 403 in a downward direction to thereby lower the tie member 404 and the brackets 401 and 402 affixed thereto. As the brackets 401 and 402 are lowered, the shaft 400 and the outfeed rollers 91 thereon move downwardly in fixed relationship with their corresponding sectors 92, and the rock shaft 405 and the guide members 59 similarly move in fixed relationship with these parts. The rollers 91 and corresponding sectors 92 are thus in position to receive the upper gusseted edge of the relatively narrow bag tube from the lowered guide members 59 upon the completion of the valving and sleeving operation. In a similar manner, to accommodate relatively wide bag tubes, the handle 460 is rotated in the opposite direction to thereby raise the guide members 59, the outfeed rollers 91 and the sectors 92.

*Driving Mechanism*

The machine is driven by a single power source, such as an electric motor 500 (FIGURE 8), which is mounted on the base 201 and is adapted to rotate a transverse shaft 501 by means of a belt 502 and a speed reduction mechanism 503. The shaft 501 is supported by two legs 504 which extend upwardly from the base 201. Positioned on the right hand end of this shaft, as viewed in FIGURE 8, is a spur gear 505 which is in meshing engagement with an intermediate gear 506 affixed to a stub shaft 507 journaled in the adjacent leg 504. The gear 506 engages a spur gear 508 mounted on the adjacent end of a transverse shaft 509 which is supported at the upper ends of the legs 504 and extends in a direction parallel to that of the shaft 501.

A drive sprocket 515 is affixed at the opposite end of the shaft 509 and accommodates the main drive chain 111. The chain 111 extends from the sprocket 515 to an idler sprocket 520 (FIGURE 1) which is suitably supported on the main frame 103. The chain follows a path from this idler sprocket to the drive sprocket 435 on the outfeed roller shaft 400 and then over the drive sprocket 436 on the outfeed sector shaft 425. The chain 111 then extends from the sprocket 436 to an idler sprocket 521 on the main frame 103, around a sprocket 522 on the lower feed roller shaft 131 and over a sprocket 523 on the upper feed roller shaft 130. From this latter sprocket, the main drive chain extends around the sprocket 110 on the feed chain shaft 107 and over an idler sprocket 524 supported adjacent one of the frame legs 301 at the infeed side of the machine to a sprocket 525 affixed to the drive shaft 141. The chain 111 then returns from the sprocket 525 to the drive sprocket 515.

As best shown in FIGURE 8, the upper transverse shaft 509 is provided with a bevel gear 531 which is disposed adjacent the right hand end of the shaft, as viewed in this figure, and is rotatable therewith. The bevel gear 531 is in meshing engagement with a bevel gear 532 on a shaft 533 suitably supported on the outfeed side of the machine. The shaft 533 is provided with two sprockets (not visible in FIGURE 8) which respectively engage a valver drive chain 535 and a sleever drive chain 536. The drive chain 535 extends from its sprocket on the shaft 533, around a sprocket 537 on the valve mechanism drive shaft 240, over two chain take-up sprockets 538 and 539 suitably supported on a transverse member 540 extending inwardly from the adjacent leg 504, and back to the sprocket on the shaft 533. The sleever drive chain 536 extends from its sprocket on the shaft 533 to the drive sprocket 302 on the sleever shaft 82, over an idler sprocket 541 rotatably supported on the adjacent leg 504, and then back to the sprocket on the shaft 533.

It will of course be understood that the various sprocket ratios, the angular positions of the drive shafts for the feeding, valving, sleeving and discharge mechanisms, etc., are all synchronized in proper timed relation. As the motor 500 rotates, the shaft 509 is similarly rotated by means of the belt 502, the mechanism 503, the shaft 501 and the spur gears 505, 506 and 507. The rotating shaft 509 drives the main drive chain 111, the valver drive chain 535 and the sleever drive chain 536 to thereby rotate their various shafts at a constant speed in the manner described heretofore.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. A machine for performing feeding, valving and sleeving operations on gusseted bags, comprising, in combination, a delivery mechanism for feeding successive bags from a supply thereof to a predetermined location, bag support means movable between a first position and a second position, said bag support means when in said first position defining a plane in which each successive bag in supported at said location, valve forming means disposed adjacent said location and adapted to form an opened valve by folding the walls of the bag at said location apart adjacent one corner thereof to effect infolding of the valve-forming portion at said one bag corner, the edge of the valve lip extending along a straight line, tucking support means movable toward and away from said valve forming means about a first axis transverse to said plane, tucking means for inserting a portion of a valve sleeve insert blank behind the lip of the opened valve of the bag at said location and into contact therewith, said tucking means including at least one tucker member supported on said tucking support means for movement relative thereto about a second axis parallel to said plane, creasing means for medially folding said blank as said valve-forming means becomes effective to close the formed and sleeved valve, discharge means disposed adjacent the second position of said bag support means, and means for moving said bag support means from said first position to said second position, to thereby move said valved and sleeved bag from said predetermined location into juxtaposition with said discharge means, said discharge means being effective to withdraw said valved and sleeved bag from said bag support means upon the movement thereof to said second position.

2. A machine for performing feeding, valving and sleeving operations on gusseted bags, comprising, in combination, a delivery mechanism for feeding successive bags from a supply thereof to a predetermined location, bag support means movable between a first position and a second position, said bag supporting means when in said first position defining a plane in which each successive bag is supported at said location, valve forming means disposed adjacent said location and adapted to form an opened valve by folding the walls of the bag at said location apart adjacent one corner thereof to effect infolding of the valve-forming portion at said one bag corner, the edge of the valve lip extending in a direction perpendicular to the side walls of the bag, tucking support means movable toward and away from said valve forming means about a first axis transverse to said plane, tucking means for inserting a portion of a valve sleeve insert blank behind the upstanding lip of the opened valve of the bag at said location and into contact therewith, said tucking means including at least one tucker member supported on said tucking support means for pivotal movement relative thereto about a second axis parallel to said plane, creasing means for medially folding said blank as said valve forming means becomes effective to close the formed and sleeved valve, discharge means for withdrawing each valved and sleeved bag in succession from said predetermined location, said discharge means including roller means disposed adjacent the second position of said bag support means, and means for moving said bag support means from said first position to said second position, to thereby position said valved and sleeved bag in juxtaposition with said roller means, said roller means being effective to withdraw said valved and sleeved bag from said bag support means upon the movement thereof to said second position.

3. A machine for performing feeding, valving and sleeving operations on gusseted bags, comprising, in combination, a delivery mechanism for automatically aligning successive bags while feeding them from a supply thereof to a predetermined location, bag support means for holding each successive bag in position at said location and including guide means movable between a first position and a second position, said guide means defining a plane in which each said bag is supported when in said first position, to prevent substantial movement thereof while at said predetermined location, valve forming means disposed adjacent said location and adapted to form an opened valve by folding the walls of the bag at said location apart adjacent one corner thereof to effect infolding of the valve-forming portion at said one bag corner, the edge of the valve lip extending in a direction perpendicular to the side walls of the bag, tucking support means movable toward and away from said valve forming means about a first axis transverse to said plane, tucking means for inserting a portion of a valve sleeve insert blank behind the upstanding lip of the opened valve of the bag at said location and into contact therewith, said tucking means including at least one tucker member supported on said tucking support means for movement relative thereto about a second axis parallel to said plane, creasing means for medially folding said blank as said valve forming means becomes effective to close the formed and sleeved valve, discharge means for withdrawing each valved and sleeved bag in succession from said predetermined location, said discharge means including roller means disposed adjacent the second position of said guide means, and means for moving said guide means from said first position to said second position, to thereby move the valved and sleeved bag from said predetermined location into juxtaposition with said roller means, said last mentioned means being effective to withdraw said valved and sleeved bag from said guide means upon the movement thereof to said second position.

4. A machine for performing feeding, valving and sleeving operations on gusseted bags, comprising, in combination, a delivery mechanism for feeding successive bags from a supply thereof to a predetermined location, bag support means for holding each successive bag in a substantially vertical, stationary position at said bag location, said support means including a rest member for supporting one of the gusseted edges of said bag and including guide means movable between a first position and a second position, said guide means defining a substantially vertical plane in which said bag is supported when in its said first position, valve forming means disposed adjacent said location and adapted to form an opened valve by folding the walls of the bag at said location apart adjacent one corner thereof to effect infolding of the valve-forming portion at said one bag corner, the edge of the valve lip extending along a straight line, press means temporarily inserted in front of said opened valve for maintaining the same in its flattened condition, tucking support means pivotally movable toward and away from said valve forming means about a first axis transverse to said plane, tucking means for inserting a portion of a valve sleeve insert blank behind the upstanding lip of the opened valve of the bag at said location and into contact therewith, said tucking means including at least one tucker member supported on said tucking support means for pivotal movement relative thereto about a second axis parallel to said plane, creasing means for medially folding said blank as said valve forming means becomes effective to close the formed and sleeved valve, discharge means disposed adjacent the second position of said guide means, and means for moving said guide means from said first position to said second position, to thereby position the other gusseted edge of the valved and sleeved bag in juxtaposition with said discharge means, said discharge means being effective to withdraw said valved and sleeved bag from said guide means upon the movement thereof to said second position.

5. A machine for performing feeding, valving and sleeving operations on gusseted bags, comprising, in combination, a delivery mechanism for feeding successive bags from a supply thereof to a predetermined location, support means for holding each successive bag in a substantially vertical, stationary position at said location, said support means including a rest member for supporting one of the gusseted edges of said bag and including guide means movable between a first, bag holding position and a second, bag releasing position, said guide means being adapted to maintain the side walls of said bag upright when in its said first position, valve forming means disposed adjacent said location and adapted to form an opened valve by folding the walls of the bag at said location apart adjacent one corner thereof to effect infolding of the valve-forming portion at said one bag corner, the infolded material forming said valve lying in a uniform, substantially flat plane with the edge of the valve lip extending in a direction perpendicular to the said walls of the bag, means for inserting a portion of a valve sleeve insert blank behind the upstanding lip of the opened valve of the bag at said location and into contact therewith, creasing means for medially folding said blank as said valve forming means becomes effective to close the formed and sleeved valve, discharge means for withdrawing each valved and sleeved bag in succession from said predetermined location, said discharge means including roller means disposed adjacent the second position of said guide means, means for moving said guide means from said first position to said second position, and pneumatic means for moving the other gusseted edge of the valved and sleeved bag in juxtaposition with said roller means, said roller means thereupon being effective to withdraw said valved and sleeved bag from said guide means.

6. A machine for performing feeding, valving and sleeving operations on gusseted bags, comprising, in combination, a delivery mechanism for automatically aligning successive bags while feeding them from a supply thereof to a predetermined location, support means for holding each successive bag in a substantially vertical position at said location, said support means including a rest member for supporting one of the gusseted edges of said bag and including guide means movable between a first position and a second position, said guide means being adapted to maintain the side walls of said bag upright when in its said first position, valve forming means disposed at said location and adapted to form an opened valve by folding the walls of said bag apart adjacent one corner thereof to effect infolding of the valve-forming portion at said one bag corner, the infolded material forming said valve lying in a uniform, substantially flat plane with the edge of the valve lip extending in a direction perpendicular to the side walls of the bag, tucking means for inserting a portion of a valve sleeve insert blank behind the upstanding lip of the opened bag valve and into contact therewith, said tucking means including at least one tucker member supported for pivotal movement about an axis transverse to said valve lip, creasing means for medially folding said blank as said valve forming means becomes effective to close the formed and sleeved valve, and discharge means for withdrawing each valved and sleeved bag in succession from said predetermined location, said discharge means including a feed roll disposed adjacent the second position of said guide means, a rotary outfeed sector operatively associated with said feed roll, means for moving said guide means from said first position to said second position, and pneumatic means for positioning the other gusseted edge of said valved and sleeved bag in juxtaposition with said feed roll, said feed roll thereupon cooperating with said outfeed sector to withdraw said valved and sleeved bag from said guide means.

7. A machine for performing feeding, valving and sleeving operations on gusseted bags, comprising, in combination, a delivery mechanism for feeding successive bags from a supply thereof to a predetermined location, support means for holding each successive bag in a substantially vertical position at said location, said support means including a rest member for supporting one of the gusseted edges of said bag and including guide means movable between a first position and a second position, said guide means being adapted to maintain the side walls of said bag upright when in its said first position, valve forming means disposed at said location for receiving said one gusseted edge adjacent one corner of said bag, said valve forming means being adapted to form an opened valve by folding the walls of said bag apart adjacent said one corner to effect infolding of the valve-forming portion at said one bag corner, the infolded material forming said valve lying in a uniform, substantially flat plane with the edge of the valve lip extending in a direction perpendicular to the side walls of the bag, press means inserted in front of said opened valve for maintaining the same in its flattened condition, tucking means for inserting a portion of a valve sleeve insert blank behind the upstanding lip of the opened bag valve and into contact therewith, creasing means for medially folding said blank as said valve forming means becomes effective to close the formed and sleeved valve, discharge means for withdrawing each valved and sleeved bag in succession from said predetermined location, said discharge means including a feed roll disposed adjacent the second position of said guide means and a rotary outfeed sector operatively associated with said feed roll, means for moving said guide means from said first position to said second position, and pneumatic means operable simultaneously with the movement of said guide means to said second position for urging the other gusseted edge of said valved and sleeved bag into juxtaposition with said feed roll, said feed roll cooperating with said outfeed sector to engage said other gusseted edge and withdraw said valved and sleeved bag from said guide means.

8. A machine for performing feeding, valving and sleeving operations on gusseted bags, comprising, in combination, a delivery mechanism for feeding successive bags from a supply thereof to a predetermined location, bag support means movable between a first position and a second position, said bag support means when in said first position defining a plane in which each successive bag is supported at said location, means for opening the gusset along one of the edges of said bag adjacent one corner thereof as the bag is delivered to said location, valve forming means disposed at said location for receiving the opened gusset of said bag, said valve forming means being adapted to form an opened valve by folding the walls of said bag apart adjacent said opened gusset to effect infolding of the valve-forming portion at said one bag corner, the edge of the valve lip extending along a straight line, tucking support means pivotally movable toward and away from said valve forming means about a first axis transverse to said plane, tucking means for inserting a portion of a valve sleeve insert blank behind the lip of the opened bag valve and into contact therewith, said tucking means including at least one tucker member supported on said tucking support means for pivotal movement relative thereto about a second axis parallel to said plane, creasing means for medially folding said blank as said valve-forming means becomes effective to close the formed and sleeved valve, discharge means disposed adjacent the second position of said bag support means, and means for moving said bag support means from said first position to said second position, to thereby position said valved and sleeved bag in juxtaposition with said discharge means, said discharge means being effective to withdraw said valved and sleeved bag from said bag support means upon the movement thereof to said second position.

9. A machine for performing feeding, valving and sleeving operations on gusseted bags, comprising, in combination, a delivery mechanism for feeding successive bags from a supply thereof to a predetermined location, support means movable between a first position and a second position and adapted when in said first position to support each successive bag at said location, means for directing compressed air toward the gusset along one of the edges of said bag adjacent one corner thereof as the bag is delivered to said location, to thereby open said gusset, valve forming means disposed at said location for receiving the opened gusset of said bag, said valve forming means being adapted to form an opened valve by folding the walls of said bag apart adjacent said opened gusset to effect infolding of the valve-forming portion at said one bag corner, the infolded material forming said opened valve lying in a uniform, substantially flat plane with the edge of the valve lip extending in a direction perpendicular to the side walls of the bag, press means temporarily inserted in front of said opened valve for maintaining the same in its flattened condition, tucking means for inserting a portion of a valve sleeve insert blank behind the lip of the opened bag valve and into contact therewith, said tucking means including at least one tucker member supported for pivotal movement about an axis transverse to said valve lip, creasing means for medially folding said blank as said valve-forming means becomes effective to close the formed and sleeved valve, discharge means for withdrawing each valved and sleeved bag in succession from said predetermined location, said discharge means including roller means disposed adjacent the second position of said support means, and means for moving said support means from said first position to said second position, to thereby position said valved and sleeved bag in juxtaposition with said roller means, said roller means being effective to withdraw said valved and sleeved bag in succession from said support means upon the movement thereof to said second position.

10. A machine for performing feeding, valving and sleeving operations on gusseted bags, comprising, in combination, a delivery mechanism for feeding successive bags from a supply thereof to a predetermined location, support means for holding each successive bag in a substantially vertical position at said location, said support means including a rest member for supporting one of the gusseted edges of said bag and including guide means movable between a first position and a second position, said guide means being adapted to maintain the side walls of said bag upright when in said first position, pneumatic means for directing compressed air toward the gusset along said one bag edge adjacent one corner thereof as the bag is delivered to said location, to thereby open said gusset, valve forming means disposed at said location, said valve forming means being adapted to grip said opened gusset and to form an opened valve by folding the walls of said bag apart adjacent said one bag corner to effect infolding of the valve-forming portion thereat, the infolded material forming said opened valve lying in a uniform, substantially flat plane with the edge of the valve lip extending in a direction perpendicular to the side walls of said bag, means for inserting a portion of a valve sleeve insert blank behind the lip of the opened bag valve and into contact therewith while the bag is at said predetermined location, creasing means for medially folding said blank as said valve-forming means becomes effective to close the formed and sleeved valve, discharge means for withdrawing each valved and sleeved bag in succession from said predetermined location, said discharge means including roller means disposed adjacent the second position of said guide means, and means for moving said guide means from said first position to said second position, to thereby position the other gusseted edge of the valved and sleeved bag in juxtaposition with said roller means, said roller means being effective to withdraw said valved and sleeved bag from said guide means upon the movement thereof to said second position.

11. A machine for performing feeding, valving and sleeving operations on gusseted bags, comprising, in combination, a delivery mechanism for feeding successive bags from a supply thereof to a predetermined location, support means for holding each successive bag in a substantially vertical position at said location, said support means including a rest member for supporting the lower gusseted edge of said bag and including guide means movable between a first position and a second position and adapted when in said first position to maintain the side walls of said bag upright, first pneumatic means for opening the gusset along said lower bag edge adjacent one corner thereof as the bag is delivered to said location, valve forming means disposed at said location, said valve forming means being adapted to grip said opened gusset and to form an opened valve by folding the walls of said bag apart adjacent said one bag corner to effect infolding of the valve-forming position thereat, the infolded material forming said opened valve lying in a uniform, substantially flat plane with the edge of the valve lip extending in a direction perpendicular to the side walls of said bag, tucking means for inserting a portion of a valve sleeve insert blank behind the lip of the opened bag valve and into contact therewith, creasing means for medially folding said blank as said valve-forming means becomes effective to close the formed and sleeved valve, and discharge means for withdrawing each valved and sleeved bag in succession from said predetermined location, said discharge means including a feed roll disposed adjacent the second position of said guide means, a rotary outfeed sector operatively associated with said feed roll, means for moving said guide means from said first position to said second position and second pneumatic means operable simultaneously with the movement of said guide means to said second position for urging the upper gusseted edge of said valved and sleeved bag into juxtaposition with said feed roll, said feed roll cooperating with said outfeed sector to engage said upper gusseted edge and withdraw said valved and sleeved bag from said guide means.

12. A machine for performing feeding, valving and sleeving operations on gusseted bags, comprising, in combination, a delivery mechanism for feeding successive gusseted bags from a supply thereof to a predetermined location, said delivery mechanism including means for momentarily engaging each said bag to thereby align the same as it is led to said location, means for opening the gusset along one edge of said bag adjacent one corner thereof as the bag approaches said location, means for supporting said bag at said location, said last mentioned means defining a plane in which said bag is supported, valve forming means disposed at said location, said valve forming means being adapted to grip said opened gusset and to form an opened valve by folding the walls of said bag apart adjacent said one bag corner to effect infolding of the valve-forming portion thereat, the edge of the valve lip extending along a straight line, tucking support means movable toward and away from said valve forming means about a first axis transverse to said plane, tucking means for inserting a first portion of a valve sleeve insert blank behind the lip of the opened bag valve and into contact therewith, said tucking means including at least one tucker member supported on said tucking support means for movement relative thereto about a second axis parallel to said plane, means for moving the remaining portion of said insert blank inwardly toward said opened valve and for medially folding said blank as said valve-forming means becomes effective to close the formed and sleeved valve, and discharge means for withdrawing each valved and sleeved bag in succession from said predetermined location.

13. A machine for performing feeding, valving and sleeving operations on gusseted bags, comprising, in combination, a delivery mechanism for feeding successive gusseted bags from a supply thereof to a predetermined location, said delivery mechanism including means for momentarily engaging each said bag to thereby align the same as it is led to said location, means for opening the gusset along one edge of said bag adjacent one corner thereof as the bag approaches said location, means for supporting said bag at said location, said last mentioned means defining a plane in which said bag is supported, valve forming means disposed at said location, said valve forming means being adapted to grip said opened gusset and to form an opened valve by folding the walls of said bag apart adjacent said one bag corner to effect infolding of the valve-forming portion thereat, the edge of the valve lip extending along a straight line in a direction perpendicular to the side walls of said bag, tucking support means rotatably movable toward and away from said valve forming means about a first axis transverse to said plane, tucking means for inserting a first portion of a valve sleeve insert blank behind the lip of the opened bag valve and into contact therewith, said tucking means including at least one tucker member supported on said tucking support means for pivotal movement relative thereto about a second axis parallel to said plane, creasing means for moving the remaining portion of said insert blank inwardly toward said opened valve in substantially coplanar relationship with said first portion and for then medially folding said blank as said valve-forming means becomes effective to close the formed and sleeved valve, and discharge means for withdrawing each valved and sleeved bag in succession from said predetermined location.

14. A machine for performing feeding, valving and sleeving operations on gusseted bags, comprising, in combination, a delivery mechanism for feeding successive gusseted bags from a supply thereof to a predetermined location, said delivery mechanism including means for momentarily engaging each said bag to thereby align the same as it is led to said location, means for opening the gusset along one edge of said bag adjacent one corner thereof as the bag approaches said location, means for supporting said bag in a substantially stationary position at said location, said last mentioned means defining a plane in which said bag is supported, valve forming means disposed at said location, said valve forming means being adapted to grip the opened gusset of the substantially stationary bag at said location and to form an opened valve by folding the walls of said bag apart adjacent said one bag corner to effect infolding of the valve-forming portion thereat, the edge of the valve lip extending along a straight line in a direction perpendicular to the side walls of said bag, tucking support means rotatably movable toward and away from said valve forming means about a first axis transverse to said plane, tucking means for inserting a first portion of a valve sleeve insert blank behind the lip of the opened valve of the bag at said location and into contact therewith, said tucking means including a pair of tucker members carried by said tucking support means and pivotally movable toward and away from each other about parallel axes extending in directions parallel to said plane and perpendicular to said first axis, creasing means for moving the remaining portion of said insert blank inwardly toward said opened valve and into contact with the outer face thereof and for then medially folding said blank as said valve-forming means becomes effective to close the formed and sleeved valve, and discharge means for withdrawing each valved and sleeved bag in succession from said predetermined location.

15. A machine as defined in claim 14 in which said tucking means is adapted to initiate the movement of said remaining blank portion toward the outer face of said opened valve, said creasing means then being effective to continue the movement of said remaining portion into contact with said outer face.

16. A machine for performing feeding, valving and sleeving operations on gusseted bags, comprising, in combination, a delivery mechanism for feeding successive bags from a supply thereof to a predetermined location, said delivery mechanism including means for momentarily engaging each said bag to thereby align the same as it is led to said location, means for opening the gusset along one edge of said bag adjacent one corner thereof as the bag approaches said location, support means for holding each successive bag in position at said location, valve forming means disposed at said location, said valve forming means being adapted to grip said opened gusset and to form an opened valve by folding the walls of said bag apart adjacent said one bag corner to effect infolding of the valve-forming portion thereat, the infolded material forming said valve lying in a uniform, substantially flat plane with the edge of the valve lip extending along a straight line in a direction perpendicular to the side walls of said bag, rotary means positioned adjacent said valve forming means for inserting a first portion of a valve sleeve insert blank behind the lip of the opened bag valve and into contact therewith, said rotary means including an elongated arm continuously rotating about a first axis parallel to said valve lip and including a tucker member transversely positioned on said arm and pivotally movable about a second axis perpendicular to said first axis, said tucker member being adapted to engage said first blank portion, creasing means for moving the remaining portion of said insert blank inwardly toward said opened valve and for medially folding said blank as said valve-forming means becomes effective to close the formed and sleeved valve, and discharge means for withdrawing each valved and sleeved bag in succession from said predetermined location.

17. A machine for performing valving and sleeving operations on gusseted bags, comprising, in combination, a delivery mechanism for feeding successive bags from a supply thereof to a predetermined location, support means for holding each successive bag in position at said location, said support means defining a plane in which each said bag is supported, valve forming means disposed at said location, said valve forming means being adapted to receive the gusset along one edge of said bag adjacent one corner thereof and to form an opened valve by folding said gusset apart adjacent said one bag corner to effect infolding of the valve-forming portion thereat, the edge of the valve lip extending along a straight line in a direction perpendicular to the side walls of said bag, rotary means positioned adjacent said valve forming means for inserting a first portion of a valve sleeve insert blank behind the lip of the opened valve of the bag at said location and into contact therewith, said rotary means including an elongated arm continuously rotating about a first axis transverse to said plane and including a tucker member pivotally positioned on said arm, said tucker member being adapted to engage said first blank portion and to insert the same behind said valve lip while extending in a direction parallel to said first axis and to then pivot about a second axis parallel to said plane and perpendicular to said first axis as said arm rotates, to thereby withdraw said tucker member from behind said valve lip, creasing means for moving the remaining portion of said insert blank inwardly toward said opened valve and for medially folding said blank as said valve-forming means becomes effective to close the formed and sleeved valve, and discharge means for withdrawing each valved and sleeved bag in succession from said predetermined location, said discharge means including roller means in position to receive the gusset along the opposite edge of each said bag and effective to withdraw said bag from said support means.

18. A machine for performing valving and sleeving operations on gusseted bags, comprising, in combination, a delivery mechanism for feeding successive bags from a supply thereof to a predetermined location, support means for holding each successive bag in position at said location, said support means defining a plane in which each said bag is supported, valve forming means disposed at said location, said valve forming means being adapted to receive the gusset along one edge of said bag adjacent one corner thereof and to form an opened valve by folding said gusset apart adjacent said one bag corner to effect infolding of the valve-forming portion thereat, the edge of the valve lip extending along a straight line, rotary means positioned adjacent said valve forming means for inserting a first portion of a valve sleeve insert blank behind the lip of the opened bag valve and into contact therewith, said rotary means including a pair of elongated arms continuously rotating about a first axis transverse to said plane, a tucker member pivotally positioned adjacent the outer end of each said arm and a clamping member pivotally connected intermediate the ends of each arm and oscillatable with respect thereto to clamp and release said insert blank, said tucker members being adapted to engage said first blank portion the clamping of said blank by said clamping members and to insert the same behind said valve lip while extending parallel to first axis and to then pivot in opposite directions about axes which extend in directions parallel to said plane and perpendicular to said first axis, to thereby withdraw said tucker members from behind said valve lip, creasing means for moving the remaining portion of said insert blank inwardly toward said opened valve and for medially folding said blank as said valve-forming means becomes effective to close the formed and sleeved valve, and discharge means for withdrawing each valved and sleeved bag in succession from said predetermined location, said discharge means including roller means in position to receive the gusset along the opposite edge of each said bag and effective to withdraw said bag from said support means.

19. In a machine for performing valving and sleeving operations on gusseted bags, the combination of support means for receiving successive gusseted bags from a supply thereof and supporting the same, said support means defining a plane in which each said bag is supported, valve forming means adjacent said support means for gripping the gusset along one edge of each said bag adjacent one corner thereof and forming an opened valve by folding said gusset apart adjacent said one bag corner to effect infolding of the valve-forming portion thereat, the edge of the valve lip extending along a straight line in a direction perpendicular to the side walls of said bag, rotary means positioned adjacent said valve forming means for inserting a first portion of a valve sleeve insert blank behind the lip of the opened bag valve and into contact therewith, said rotary means including an elongated arm continuously rotating about a first axis transverse to said plane and including a tucker member pivotally positioned on said arm, said tucker member being adapted to engage said first blank portion and to insert the same behind said valve lip while extending in a direction parallel to first axis and to then pivot about a second axis parallel to said plane as said arm rotates, to thereby withdraw said tucker member from behind said valve lip, and creasing means for moving the remaining portion of said insert blank inwardly toward said opened valve and for medially folding said blank as said valve-forming means becomes effective to close the formed and sleeved valve.

20. In a machine for performing valving and sleeving operations on gusseted bags, the combination of support means for receiving successive gusseted bags from a supply thereof and supporting the same, said support means defining a plane in which each said bag is supported, valve forming means adjacent said support means for gripping the gusset along one edge of each said bag adjacent one corner thereof and forming an opened valve by folding said gusset apart adjacent said one bag corner to effect infolding of the valve-forming portion thereat, the edge of the valve lip extending along a straight line in a direction perpendicular to the side walls of said bag, press means temporarily inserted in front of said opened valve for maintaining the same in its flattened condition, rotary means positioned adjacent said valve forming means for inserting a first portion of a valve sleeve insert blank behind the lip of the opened bag valve and into contact therewith, said rotary means including an elongated arm continuously rotating about a first axis transverse to said plane, a tucker member pivotally positioned adjacent the outer end of said arm and a clamping member pivotally connected intermediate the ends of said arm and oscillatable with respect thereto to clamp and release said insert blank, said tucker member being adapted to engage said first blank portion upon the clamping of said blank by said clamping member and to insert the same behind said valve lip while extending in a direction parallel to said first axis and to then pivot about a second axis parallel to said plane as said arm rotates, to thereby withdraw said tucker member from behind said valve lip, and creasing means for moving the remaining portion of said insert blank inwardly toward said opened valve and for medially folding said blank as said valve-forming means becomes effective to close the formed and sleeved valve.

21. In a machine for performing valving and sleeving operations on gusseted bags, the combination of support means for receiving successive gusseted bags from a supply thereof and supporting the same, said support means defining a plane in which each said bag is supported, valve forming means adjacent said support means for gripping the gusset along one edge of each said bag adjacent one corner thereof and forming an opened valve by folding said gusset apart adjacent said one bag corner to effect infolding of the valve-forming portion thereat, the edge of the valve lip extending along a straight line in a direction perpendicular to the side walls of said bag, rotary means positioned adjacent said valve forming means for inserting a first portion of a valve sleeve insert blank behind the lip of the opened bag valve and into contact therewith, said rotary means including an elongated arm continuously rotating about a first axis transverse to said plane and including a tucker member pivotally positioned adjacent the outer end of said arm, said tucker member being adapted to engage said first blank portion and to insert the same behind said valve lip while extending in a direction parallel to said first axis and to then pivot about a second axis parallel to said plane as said arm rotates, to thereby withdraw said tucker member from behind said valve lip, said rotary means also being effective to initiate movement of the remaining portion of said blank toward the outer face of said opened valve; and creasing means for moving said remaining portion inwardly into full contact with said outer face and for medially folding said blank as said valve-forming means becomes effective to close the formed and sleeved valve.

22. In a machine for performing valving and sleeving operations on gusseted bags, the combination of support means for receiving successive gusseted bags from a supply thereof, and supporting the same, said support means defining a plane in which each said bag is supported, valve forming means adjacent said support means for gripping the gusset along one edge of each said bag adjacent one corner thereof and forming an opened valve by folding said gusset apart adjacent said one bag corner to effect infolding of the valve-forming portion thereat, the edge of the valve lip extending along a straight line in a direction perpendicular to the side walls of said bag, rotary means positioned adjacent said valve forming means for inserting a first portion of a valve sleeve insert blank behind the lip of the opened bag valve and into contact therewith, said rotary means including a pair of elongated arms continuously rotating about a first axis transverse to said plane, a laterally extending clamp plate affixed to each said arm, a tucker member pivotally positioned on each arm adjacent the outer end thereof and a clamping member pivotally connected intermediate the ends of each arm and oscillatable with respect thereto to momentarily clamp said insert blank between said clamping member and the corresponding clamp plate, said tucker members being adapted to engage said first blank portion upon the clamping of said blank and to insert the same behind said valve lip while extending parallel to said first axis and to then pivot about axes which extend in directions parallel to said plane and perpendicular to said first axis, to thereby withdraw said tucker members from behind said valve lip, said rotary means also being effective to initiate movement of the remaining portion of said blank toward the outer face of said opened valve, and creasing means for moving said remaining portion inwardly into full contact with said outer face and for medially folding said blank as said valve-forming means becomes effective to close the formed and sleeved valve.

23. In a machine for performing valving and sleeving operations on gusseted bags, the combination of support means for receiving successive gusseted bags from a supply thereof and supporting the same, said support means defining a plane in which each said bag is supported, valve forming means adjacent said support means for gripping the gusset along one edge of each said bag adjacent one corner thereof and forming an opened valve by folding said gusset apart adjacent said one bag corner to effect infolding of the valve-forming portion thereat, the edge of the valve lip extending along a straight line in a direction perpendicular to the side walls of said bag, rotary means positioned adjacent said valve forming means for inserting a first portion of a valve sleeve insert blank behind the lip of the opened bag valve and into contact therewith, said rotary means including a pair of elongated arms continuously rotating about a first axis transverse to said plane and including a tucker member pivotally positioned on each said arm, said tucker members being adapted to engage said first blank portion and to insert the same behind said valve lip while extending parallel to first axis and to then pivot in opposite directions about axes which extend in directions parallel to said plane and perpendicular to said first axis, to thereby withdraw said tucker members from behind said valve lip, and creasing means for moving the remaining portion of said insert blank inwardly toward said opened valve into substantially coplanar relationship with said first blank portion and for then medially folding said blank as said valve-forming means becomes effective to close the formed and sleeved valve.

24. In a machine for performing valving and sleeving operations on gusseted bags, the combination of support means for receiving successive gusseted bags from a supply thereof and supporting the same, said support means defining a plane in which each said bag is supported, valve forming means adjacent said support means for gripping the gusset along one edge of each said bag adjacent one corner thereof and forming an opened valve by folding said gusset apart adjacent said one bag corner to effect infolding of the valve-forming portion thereat, the edge of the valve lip extending along a straight line in a direction perpendicular to the side walls of said bag, rotary means positioned adjacent said valve forming means for inserting a first portion of a valve sleeve insert blank behind the lip of the opened bag valve and into contact therewith, said rotary means including a pair of elongated arms continuously rotating about a first axis transverse to said plane, a tucker member pivotally positioned adjacent the outer end of each said arm and a clamping member pivotally connected intermediate the ends of each arm and oscillatable with respect thereto to clamp and release said insert blank, said tucker members being adapted to engage said first blank portion upon the clamping of said blank by said clamping members and to insert the same behind said valve lip while extending parallel to said first axis and to then pivot in opposite directions about axes which extend in directions parallel to said plane and perpendicular to said first axis to thereby withdraw said tucker members from behind said valve lip, and creasing means for moving the remaining portion of said insert blank inwardly toward said opened valve into substantially coplanar relationship with said first blank portion and for then medially folding said blank as said valve-forming means becomes effective to close the formed and sleeved valve.

25. In a machine for performing valving and sleeving operations on gusseted bags, the combination of valve forming means for receiving successive gusseted bags from a supply thereof, means for directing compressed air toward one of the gussets of each of said bags as it is received by said valve forming means, to thereby open said one gusset, said valve forming means being adapted to grip the opened gusset along one edge of each said bag adjacent one corner thereof and to form an opened valve for folding said gusset apart adjacent said one bag corner to effect infolding of the valve-forming portion thereat, the infolded material forming said valve lying in a uniform, substantially flat plane with the edge of the valve lip extending along a straight line in a direction perpendicular to the side walls of said bag, press means temporarily inserted in front of said opened valve for maintaining the same in its flattened condition, rotary means positioned adjacent said valve forming means for inserting a first portion of a valve sleeve insert blank behind the lip of the opened bag valve and into contact therewith, said rotary means including a pair of elongated, substantially parallel arms continuously rotating about an axis parallel to said valve lip, a tucker member pivotally positioned on each said arm adjacent the outer end thereof and an elongated clamping member pivotally connected intermediate the ends of each arm and oscillatable with respect thereto to temporarily clamp said insert blank between said clamping member and said tucker member, said tucker members being adapted to insert the clamped first blank portion behind said valve lip while extending in a direction parallel to said axis and to then pivot in opposite directions about the axes of their corresponding arms as the arms rotate, to thereby withdraw said tucker members from behind said valve lip, and creasing means for moving the remaining portion of said insert blank inwardly toward said opened valve into substantially coplanar relationship with said first blank portion and for then medially folding said blank as said valve-forming means becomes effective to close the formed and sleeved valve.

26. In a machine for performing valving and sleeving operations on gusseted bags, the combination of valve forming means for receiving successive gusseted bags from a supply thereof, said valve forming means being adapted to grip the gusset along one edge of each said bag adjacent one corner thereof and to form an opened valve by folding said gusset apart adjacent said one bag corner to effect infolding of the valve-forming portion thereat, the infolded material forming said valve lying in a uniform, substantially flat plane with the edge of the valve lip extending along a straight line in a direction perpendicular to the side walls of said bag, press means temporarily inserted in front of said opened valve for maintaining the same in its flattened condition, rotary means positioned adjacent said valve forming means for inserting a first portion of a valve sleeve insert blank behind the lip of the opened bag valve and into contact therewith, said rotary means including a pair of elongated arms continuously rotating about an axis parallel to said valve lip, a tucker member and a clamping member pivotally connected to each said arm, each said clamping member being adapted to oscillate on the corresponding arm to clamp and release said insert blank, said tucker members being adapted to engage said first blank portion upon the clamping of said blank and to insert the same behind said valve lip while said tucker members extend in a direction parallel to said axis, said tucker members then being adapted to pivot in opposite directions about their corresponding rotating arms, to thereby withdraw said tucker members from behind said valve lip, and creasing means for moving the remaining portion of said insert blank inwardly toward said opened valve and for medially folding said blank as said valve-forming means becomes effective to close the formed and sleeved valve.

27. A machine for performing feeding, valving and sleeving operations on gusseted bags, comprising, in combination, a delivery mechanism for feeding successive bags from a supply thereof to a predetermined location, support means movable between a first position and a second position and adapted when in said first position to support each successive bag at said location, valve forming means disposed at said location, said valve forming means being adapted to grip the gusset along one edge of said bag adjacent one corner thereof and to form an opened valve by folding the gusset of said bag apart adjacent said one bag corner to effect infolding of the valve-forming portion thereat, the infolded material forming said valve lying in a uniform, substantially flat plane at right angles to the longitudinal axis of said bag with the edge of the valve lip extending along a straight line, rotary means for inserting a first portion of a valve sleeve insert blank behind the lip of the opened bag valve and into contact therewith, said rotary means including an elongated arm continuously rotating about an axis parallel to said valve lip and including a tucker member transversely positioned on said arm and pivotally movable about the axis thereof, said tucker member being adapted to engage said first valve portion, creasing means for moving the remaining portion of said insert blank inwardly toward said opened valve and for medially folding said blank as said valve-forming means becomes effective to close the formed and sleeved valve, discharge means disposed adjacent the second position of said support means, and means for moving said support means from said first position to said second position, to thereby position said valved and sleeved bag in juxtaposition with said discharge means, said discharge means being effective to withdraw said valved and sleeved bag from said support means upon the movement thereof to said second position.

28. A machine as defined in claim 27 in which said delivery mechanism includes first feeding means for advancing each said bag along a horizontal path, second feeding means for advancing said bag along a substantially vertical path to said support means at said predetermined location, and clamping means for gripping said bag as it is advanced by said first feeding means and transferring the clamped bag to said second feeding means.

29. A machine as defined in claim 28 in which each of said feeding means includes a continuously operable chain, and in which said clamping means is affixed to the chain for said second feeding means and is adapted to automatically grasp the leading gusseted edge of the bag tube on said first feeding means and to draw said tube downwardly along the chain for said second feeding means.

30. A machine for performing feeding, valving and sleeving operations on gusseted bags, comprising, in combination, a delivery mechanism for feeding successive bags from a supply thereof to a predetermined location, support means for holding each successive bag in a substantially vertical position at said location, said support means including a rest member for supporting one of the gusseted edges of said bag and including guide means movable between a first position and a second position, said guide means being adapted to maintain the side walls of said bag upright when in its said first position, means for opening the gusset along said one bag edge adjacent one corner thereof as the bag is delivered to said location, valve forming means disposed at said location for receiving the opened gusset of said bag, said valve forming means being adapted to form an opened valve by folding the walls of said bag apart adjacent said opened gusset to effect infolding of the valve-forming portion at said one bag corner, the infolded material forming said opened valve lying in a uniform, substantially flat plane with the edge of the valve lip extending in a direction perpendicular to the side walls of the bag, rotary means for inserting a portion of a valve sleeve insert blank behind the upstanding lip of the opened bag valve and into contact therewith, said rotary means including an elongated arm continuously rotating about an axis parallel to said valve lip and including a tucker member transversely positioned on said arm and pivotally movable about the axis thereof, said tucker member being adapted to engage said first valve portion, creasing means for moving the remaining portion of said insert blank inwardly toward said opened valve and for medially folding said blank as said valve forming means becomes effective to close the formed and sleeved valve, discharge means for withdrawing each valved and sleeved bag in succession from said predetermined location, said discharge means including a feed roll disposed adjacent the second position of said guide means and a rotary outfeed sector operatively associated with said feed roll, means for moving said guide means from said first position to said second position, and pneumatic means for positioning the other gusseted edge of the valved and sleeved bag in juxaposition with said feed roll, said feed roll cooperating with said outfeed sector to withdraw said bag from said guide means.

31. A machine as defined in claim 30 in which said discharge means includes means for applying final creasing pressure to the formed and sleeved valve for each said bag subsequent to the withdrawal thereof from said guide means.

32. A machine for performing feeding, valving and sleeving operations on gusseted bags, comprising, in combination, a delivery mechanism for feeding successive bags from a supply thereof to a predetermined location, support means for holding each successive bag in a substantially vertical position at said location, said support means including a rest member for supporting one of the gusseted edges of said bag and including guide means movable between a first position and a second position, said guide means being adapted to maintain the side walls of said bag upright when in its said first position, means for opening the gusset along said one bag edge adjacent one corner thereof as the bag is delivered to said location, valve forming means disposed at said location, valve forming means disposed at said location for receiving the opened gusset of said bag, said valve forming means being adapted to form an opened valve by folding the walls of said bag apart adjacent said opened gusset to effect infolding of the valve-forming portion at said one bag corner, the infolded material forming said opened valve lying in a uniform, substantially flat plane with the edge of the valve lip extending in a direction perpendicular to the side walls of the bag, press means temporarily inserted in front of said opened valve for maintaining the same in its flattened condition, rotary means positioned adjacent said valve forming means for inserting a first portion of a valve sleeve insert blank behind the lip of the opened bag valve and into contact therewith, said rotary means including a pair of elongated arms continuously rotating about an axis parallel to said valve lip, a tucker member and a clamping member pivotally connected to each said arm, each said clamping member being adapted to oscillate on the corresponding arm to clamp and release said insert blank, said tucker members being adapted to engage said first blank portion upon the clamping of said blank and to insert said first blank portion behind said valve lip while said tucker members extend in a direction parallel to said axis, said tucker members then being adapted to pivot in opposite directions about their corresponding rotating arms, to thereby withdraw said tucker members from behind said valve lip, creasing means for moving the remaining portion of said insert blank inwardly toward said opened valve and for medially folding said blank as said valve forming means becomes effective to close the formed and sleeved valve, and discharge means for withdrawing each valved and sleeved bag in succession from said predetermined location, said discharge means including a feed roll disposed adjacent the second position of said guide means, a rotary outfeed sector operatively associated with said feed roll, and means for moving said guide means from said first position to said second position, to thereby position the other gusseted edge of the valved and sleeved bags in juxaposition to said feed roll, said feed roll cooperating with said outfeed sector to withdraw said bag from said guide means upon the movement thereof to said second position.

References Cited in the file of this patent

UNITED STATES PATENTS

| | | |
|---|---|---|
| 2,205,633 | Sharkey | June 25, 1940 |
| 2,387,274 | Lee | Oct. 23, 1945 |
| 2,643,588 | Burroughs | June 30, 1953 |
| 2,809,569 | Hollis | Oct. 15, 1957 |